(12) United States Patent
Yonezaki et al.

(10) Patent No.: US 10,603,871 B2
(45) Date of Patent: Mar. 31, 2020

(54) METHOD FOR PRODUCING GLASS UNIT AND PRESSURE-SENSITIVE ADHESIVE SHEET

(71) Applicants: NITTO DENKO CORPORATION, Ibaraki-shi, Osaka (JP); NITTO BELGIUM NV, Genk (BE)

(72) Inventors: Kousuke Yonezaki, Osaka (JP); Hakaru Horiguchi, Osaka (JP); Peter Gruyters, Genk (BE); Donald Pinxten, Genk (BE)

(73) Assignees: NITTO DENKO CORPORATION, Ibaraki-shi, Osaka (JP); NITTO BELGIUM NV, Genk (BE)

( * ) Notice: Subject to any disclaimer, the term of this patent is extended or adjusted under 35 U.S.C. 154(b) by 71 days.

(21) Appl. No.: 15/946,198

(22) Filed: Apr. 5, 2018

(65) Prior Publication Data

US 2019/0202171 A1    Jul. 4, 2019

Related U.S. Application Data

(60) Provisional application No. 62/611,039, filed on Dec. 28, 2017.

(51) Int. Cl.
*B32B 7/06* (2019.01)
*B32B 43/00* (2006.01)
(Continued)

(52) U.S. Cl.
CPC .................. *B32B 7/06* (2013.01); *B32B 7/12* (2013.01); *B32B 17/06* (2013.01); *B32B 17/064* (2013.01);
(Continued)

(58) Field of Classification Search
USPC ........ 156/247, 249, 325, 701, 714; 428/343, 428/355 R, 355 AC
See application file for complete search history.

(56) References Cited

U.S. PATENT DOCUMENTS

2012/0135231 A1    5/2012    Yoshida et al.
2012/0219795 A1    8/2012    Mitsui et al.
(Continued)

FOREIGN PATENT DOCUMENTS

EP    2 562 226 A1    2/2013
EP    2 690 149 A1    1/2014
(Continued)

OTHER PUBLICATIONS

Extended European Search Report dated Aug. 10, 2018 issued by the European Patent Office in counterpart application No. 18166117.4.

*Primary Examiner* — Sing P Chan
(74) *Attorney, Agent, or Firm* — Sughrue Mion, PLLC

(57) ABSTRACT

Provided is a method for producing a glass unit. The method comprises a step (A) of obtaining a glass plate; a step (B) of applying a protective sheet to one face of the glass plate; an optional step (C) of subjecting the glass plate to at least one process selected from the group consisting of transportation, storage, processing, washing and handling; a step (D) of removing the protective sheet from the glass plate; and a step (E) of assembling a glass unit using the glass plate. The protective sheet comprises a substrate layer, and a PSA layer provided to at least one face of the substrate layer. The PSA layer has a surface hardness of 0.3 MPa or greater.

20 Claims, 2 Drawing Sheets

(51) Int. Cl.
  *C09J 133/10* (2006.01)
  *C09J 5/00* (2006.01)
  *C09J 133/08* (2006.01)
  *C09J 7/38* (2018.01)
  *C03C 17/36* (2006.01)
  *B65G 49/06* (2006.01)
  *B32B 17/06* (2006.01)
  *B32B 7/12* (2006.01)

(52) U.S. Cl.
  CPC .......... *B32B 43/006* (2013.01); *B65G 49/069* (2013.01); *C03C 17/36* (2013.01); *C09J 5/00* (2013.01); *C09J 7/381* (2018.01); *C09J 7/383* (2018.01); *C09J 7/385* (2018.01); *C09J 133/08* (2013.01); *C09J 133/10* (2013.01); *B32B 2307/584* (2013.01); *C09J 2201/622* (2013.01); *C09J 2421/00* (2013.01); *C09J 2423/006* (2013.01); *C09J 2427/006* (2013.01); *C09J 2433/00* (2013.01); *C09J 2467/006* (2013.01)

(56) References Cited

U.S. PATENT DOCUMENTS

2016/0152870 A1* 6/2016 Yoshie .................. C09J 167/02
2017/0283661 A1   10/2017 Yonezaki et al.

FOREIGN PATENT DOCUMENTS

| EP | 2 150 669 B1 | 2/2016 |
| EP | 3 029 121 A2 | 6/2016 |
| EP | 3 225 669 A1 | 10/2017 |
| JP | 3571460 B2 | 9/2004 |
| JP | 2012-131976 A | 7/2012 |
| JP | 5719194 B2 | 5/2015 |
| JP | 2017-186517 A | 10/2017 |
| WO | 2016/139318 A1 | 9/2016 |

\* cited by examiner (A) Preparation (B) Application (C) Protection (D) Removal (E) Assembly

METHOD FOR PRODUCING GLASS UNIT AND PRESSURE-SENSITIVE ADHESIVE SHEET

CROSS-REFERENCE

The present application claims priority to U.S. Provisional Patent Application No. 62/611,039 filed on Dec. 28, 2017, the entire contents of which are incorporated herein by reference.

BACKGROUND OF THE INVENTION

1. Field of the Invention

The present invention relates to a method for producing a glass unit and a pressure-sensitive adhesive sheet preferably used in the method.

2. Description of the Related Art

In processing and transporting various articles, in known techniques to prevent damage (scratches, contamination, corrosion, etc.) of their surfaces, protective sheets are bonded to the surfaces for protection. The objects to be protected vary widely. For instance, protective sheets are used on glass plates bearing Low-E (Low-Emissivity) layers as well. Low-E-layer-bearing glass plates are preferably used as building materials such as window glass because of the effects of the Low-E layers to improve the efficiency to cool down and heat up indoor spaces. In producing such a glass plate, usually, until a Low-E-layer-bearing glass plate and another glass plate are assembled into a pair-glass (e.g. dual-pane glass) with the Low-E layer surface on the inside, a protective sheet is applied via its adhesive layer to the Low-E layer surface which will be otherwise left exposed. This protects the Low-E layer from damage, wearing, degradation, etc. When the Low-E layer includes a silver layer, it is susceptible to corrosion due to moisture. Thus, the entire Low-E layer surface of the glass plate is covered with a protective sheet. Conventional art documents related to methods for producing glass units include EP2150669B1 (Patent Document 1) and WO2016/139318A1 (Patent Document 2).

In these applications, as a removable bonding means, pressure-sensitive adhesive (or PSA; the same applies hereinafter) can be preferably used. In general, pressure-sensitive adhesive has characteristics of being in a soft solid (viscoelastic) state in a room temperature range and easily adhering to adherend under some pressure. A surface protective sheet using PSA typically has a PSA layer on one face of a substrate sheet formed of a material such as resin and is constituted so as to achieve a protection purpose when applied via the PSA layer to an adherend (an object to be protected). Conventional art documents disclosing PSA sheets usable as surface protective sheets include JP2017-186517A (Patent Document 3), JP5719194B2 (Patent Document 4), JP2012-131976A (Patent Document 5) and JP3571460B2 (Patent Document 6). Patent Document 3 discloses a surface protective sheet that protects the surface of a metal plate while it is being drawn. Patent Document 4 discloses a surface protective sheet for optical film such as polarizing plates. Patent Document 5 relates to a surface protective sheet for a self-cleaning hydrophilic coated plate. Patent Document 6 is directed to easy removal of a surface protective sheet for metal plates on which top coats are formed and to reduction of the degree of contamination caused by it.

SUMMARY OF THE INVENTION

PSA sheets used for surface protection are removed from adherends when appropriate after serving protection purposes. For surface protection purposes, it is desirable that they are adequately adhesive in view of the protection of adherend while being able to maintain light peel even after a certain time period from the adhesion to the adherend. For instance, when a PSA sheet is used for surface protection of a glass plate having a Low-E layer, the PSA sheet is required to have a property that allows its easy removal from the glass plate surface after transportation, storage, processing such as cutting, washing such as a water wash, and various kinds of handling that may be associated with wearing, degradation, etc. However, the adhesive strength of PSA usually tends to increase with aging. This is because the adhesive strength of PSA which is a viscoelastic body can be mediated by chemical interactions with the adherend material and also by the wetting properties relative to the adherend surface, but the wetting that spreads to the adherend gradually proceeds based on the viscosity parameter (loss modulus) $G''$. When the object to be protected is a flat glass plate, the adhesive strength is likely to increase due to the tightness of adhesion based on the wetting properties. Glass plates used for building materials such as window glass typified by Low-E-layer-bearing glass plates now undergo enlargement of surface area in view of efficiency of production, transportation, etc., and mainstream pieces now have surface widths of greater than 2.6 m, or even 3 m or greater. Enlargement of surface area of adherend leads to enlargement of adhesive area of the protective sheet (PSA sheet) and even a slight increase in aged adhesive strength may result in heavy peeling as a whole, reducing the efficiency of removal. A certain means is required to suppress the aged adhesive strength to a level that does not compromise the efficiency of removal for adherends with large surface areas as well.

This invention has been made in view of these circumstances with an objective to provide a method for producing a glass unit that enjoys improved efficiency of removal of a protective sheet used in the production process. Another objective of this invention is to provide a PSA sheet that shows suppressed aged adhesive strength and excellent efficiency of removal from adherend.

The present application provides a method for producing a glass unit. The method comprises a step (A) of obtaining a glass plate; a step (B) of applying a protective sheet to one face of the glass plate; an optional step (C) of carrying out at least one process selected from the group consisting of transportation, storage, processing, washing and handling; a step (D) of removing the protective sheet from the glass plate; and a step (E) of assembling a glass unit using the glass plate. Here, the protective sheet comprises a substrate layer and a PSA layer provided to at least one face of the substrate layer. The PSA layer has a surface hardness of 0.3 MPa or greater.

According to this method, a glass plate is protected from damage, wearing, degradation, corrosion and so on by the presence of the protective sheet during transportation, storage, processing such as cutting, washing such as a water wash, various kinds of handling, etc. As described earlier, the adhesive strength of PSA increases with the progress of wetting of the adherend surface with the PSA based on the viscosity parameter (loss modulus) $G''$ of the PSA layer surface. This property of the PSA layer surface is precisely characterized as mechanical properties based on nanoindentation measurements. Studies by the present inventors have revealed that when the surface hardness of the PSA layer is suitably set, the aged adhesive strength can be suppressed to a level that does not compromise the efficiency of removal. In other words, when a PSA having a surface hardness of 0.3 MPa or greater is used for protection of a glass plate surface, the PSA's aged adhesive strength is suppressed to bring about excellent efficiency of removal. In the method above, with easier removal of the protective sheet used in the production process, glass units can be efficiently produced.

In a preferable embodiment, the glass plate has a glass substrate and a Low-E layer (in other words, Low-E coating) placed on the glass plate. In a typical embodiment, the Low-E layer may include a metal layer. More specifically, the Low-E layer may include a silver layer. The thickness of the Low-E layer may typically be 1000 nm or less. For a glass plate having such a Low-E layer, the method disclosed herein is employed to preferably bring about the effects of the art disclosed herein.

In a preferable embodiment, the glass plate has a width of 1 m or greater. The width of the glass plate can be 2 m or greater, greater than 2.6 m, or even 3 m or greater. For a glass plate having such a relatively large surface area, the method disclosed herein is employed to preferably bring about the effect to facilitate the removal by means of suppressing the aged adhesive strength. While not limited to an embodiment using a glass plate with such a large surface area, the step (B) may include a step of entirely covering one face of the glass plate with at least one of the PSA sheet.

In a preferable embodiment, the step (C) is essential and in the step (C), the glass plate is washed using water. The protective sheet protecting the glass plate can provide good protection to the glass plate even when exposed to the wash.

This description also provides a method for protecting an article surface, the method including a step of applying a protective sheet to the surface of the article before, during or after processing (an application step). In this method, the protective sheet comprises a substrate layer and a PSA layer provided to at least one face of the substrate layer. The PSA layer has a surface hardness of 0.3 MPa or greater. With the use of the PSA having a surface hardness of 0.3 MPa or greater to protect the article surface, the aged adhesive strength of the PSA is suppressed and excellent efficiency of removal is obtained.

The "article" in this description encompasses not only a product, but also a part (component) and an in-process material that is used only in the production process of a product. The "article surface" may be the entire surface of the article or part of the article surface.

The surface protection method according to a preferable embodiment further includes a step of removing the protective sheet from the article (a removal step). Between the application step and the removal step, it may optionally include at least one process selected from the group consisting of transporting, storing, processing, washing and handling the article having the protective sheet applied thereon. This protects the article from damage, wearing, degradation, corrosion and so on by the presence of the protective sheet during transportation, storage, processing such as cutting, washing such as a water wash and various kinds of handling. Because the protective sheet is then efficiently removed from the adherend, it is not interfering.

In a preferable embodiment, the application step includes a step of applying the protective sheet to one face of a glass plate as the article. More preferably, the glass plate has a Low-E layer on the one face. The application step includes a step of applying the protective sheet to the Low-E-layer-bearing face of the glass plate. The surface protection method disclosed herein is preferably applied to a glass plate surface, in particular, a Low-E layer surface of a glass plate.

In a preferable embodiment, the glass plate has a width of 1 m or greater. The application step includes a step of entirely covering one face of the glass plate with at least one of the protective sheet. For a glass plate having such a relatively large surface area, the surface protection method disclosed herein is employed to preferably bring about the effect to facilitate the removal through suppression of the aged adhesive strength.

This description provides a PSA sheet comprising a substrate layer and a PSA layer provided to at least one face of the substrate layer. The PSA layer has a surface hardness of 0.3 MPa or greater. The use of the PSA layer having a surface hardness of 0.3 MPa or greater, the applied PSA sheet will show suppressed aged adhesive strength and provide excellent efficiency of removal from adherend.

In a preferable embodiment of the art disclosed herein (including the glass unit production method, the surface protection method, the PSA sheet and the surface protective sheet; the same applies hereinafter), the PSA layer has a surface hardness of 5 MPa or less. With the surface hardness of the PSA layer being 5 MPa or less, the tightness of adhesion to adherend increases to obtain desirable adhesion. The use of a PSA having a surface hardness of 0.3 MPa or greater and 5 MPa or less can preferably combine adherend protection based on the tightness of adhesion to the adherend and efficiency of removal based on the suppressed aged adhesive strength. In a more preferable embodiment, the PSA layer has a surface hardness of 0.3 MPa or greater and less than 0.7 MPa. In another preferable embodiment, the surface hardness of the PSA layer is 0.7 MPa or greater and 5 MPa or less.

In a preferable embodiment of the art disclosed herein, the initial peel strength to a glass plate is 0.01 N/20 mm to 5 N/20 mm. With the initial peel strength being 0.01 N/20 mm or greater, the PSA adheres to the adherend surface. In particular, when the PSA sheet disclosed herein is used in an embodiment where it is applied to an adherend having a large surface area, in view of the efficiency of removal, it is desirable that the initial peel strength is limited to or below a certain value. With respect to an adherend having such a large surface area, the PSA sheet according to a preferable embodiment disclosed herein is preferably used. The PSA sheet with initial peel strength limited to or below 5 N/20 mm provides excellent removability as well as excellent ease of re-application and removal.

In a preferable embodiment of the art disclosed herein, the PSA layer is formed from a water-dispersed PSA composition, a solvent-based PSA composition or a hot-melt PSA composition. The PSA layer disclosed herein can be favorably prepared by using these PSA compositions.

In a preferable embodiment of the art disclosed herein, the PSA layer is an acrylic PSA layer comprising an acrylic polymer as its base polymer or a rubber-based PSA layer comprising a rubber-based polymer as its base polymer. With the use of the acrylic polymer or the rubber-based polymer as the base polymer, a PSA layer having a surface hardness in the prescribed ranges can be preferably prepared. It is preferable that the base polymer is chemically or physically crosslinked. It is more preferable that the base polymer is an acrylic polymer crosslinked by a crosslinking agent. It is particularly preferable that the crosslinking agent is at least one species selected from the group consisting of an isocyanate-based crosslinking agent, an epoxy-based crosslinking agent, an oxazoline-based crosslinking agent and an aziridine-based crosslinking agent.

In a preferable embodiment of the art disclosed herein, the ethyl acetate-insoluble portion of the PSA layer has a weight fraction (gel fraction) of 80% or higher. By increasing the gel fraction to or above the prescribed value, the surface hardness of the PSA layer can be increased as well.

In a preferable embodiment of the art disclosed herein, the base polymer has a glass transition temperature (Tg) of −65° C. or higher and −5° C. or lower. With the use of the base polymer having a Tg in this range, suitable cohesive strength is provided to the PSA and the tightness of adhesion to adherend is likely to be combined with suppression of aged adhesive strength.

In a preferable embodiment of the art disclosed herein, the substrate layer is a resin film. The use of non-porous and durable resin film as the protective sheet material, the adherend can be protected from damage including various types of external force, degradation, wearing, corrosion, etc. More preferably, the substrate layer includes a polyolefinic resin layer, a polyester-based resin layer or a polyvinyl chloride-based resin layer. The PSA sheet formed from these materials is likely to combine conformability to and protection of the adherend. From the same standpoint, it is yet more preferable that the substrate layer has a thickness of 25 µm to 150 µm.

In a preferable embodiment of the art disclosed herein, the PSA layer has a thickness of 20 µm or less. By limiting the thickness of the PSA layer, a thin PSA sheet can be preferably fabricated. According to the thin PSA layer, the initial adhesive strength and the aged adhesive strength are easily adjusted to preferable ranges.

The PSA sheet disclosed herein shows suppressed aged adhesive strength and excellent efficiency of removal from adherend. Thus, it is preferably used as a surface protective sheet to be removed at the end of a protection period. Such a surface protective sheet preferably comprises the PSA sheet disclosed herein and this PSA sheet comprises the PSA layer provided to one face of the substrate layer. The PSA sheet disclosed herein is favorable as a surface protective sheet for a glass plate used as a building material such as window glass. More specifically, the glass plate may have a Low-E layer on one face. For protection of the Low-E layer surface, the PSA sheet disclosed herein is preferably used. This can prevent the Low-E layer from suffering damage, degradation, wearing, corrosion, etc. Because the PSA sheet disclosed herein shows suppressed aged adhesive strength, it is preferably used to an adherend surface having a large surface area which tends to be greatly affected by an increase in aged adhesive strength. The PSA sheet disclosed herein is preferably used in an embodiment entirely covering one face of a flat plate (favorably a flat plate having a smooth surface, typically a glass plate) having a width of 1 m or greater, for instance, 2 m or greater (or even 3 m or greater).

DETAILED DESCRIPTION OF THE INVENTION

Preferred embodiments of the present invention are described below. Matters necessary to practice this invention other than those specifically referred to in this description can be understood by a person skilled in the art based on the disclosure about implementing the invention in this description and common technical knowledge at the time of application. The present invention can be practiced based on the contents disclosed in this description and common technical knowledge in the subject field.

<Glass Unit Production Method>

The glass unit production method disclosed herein comprises a step (A) of obtaining a glass plate; a step (B) of applying a protective sheet to one face of the glass plate; an optional step (C) of carrying out at least one process selected from the group consisting of transportation, storage, processing, washing and handling; a step (D) of removing the protective sheet from the glass plate; and a step (E) of assembling a glass unit using the glass plate. In this method, the protective sheet disclosed herein is used as a protective sheet (or a surface protective sheet). Hereinafter, as a favorable example of the production method disclosed herein, a method for producing a glass unit that includes a glass plate having a Low-E layer is described while referring to FIGS. 1(A)-1(E). However, the production method disclosed herein is not to be limited to such an embodiment. The glass plate used in this production method is not limited to a glass plate having a Low-E layer.

Figure 1:
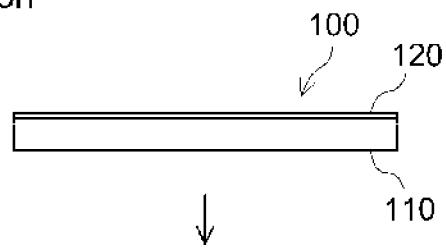
FIGS. 1(A) to 1(E) show a schematic diagram illustrating an embodiment of the glass unit production method.
Figure 1:
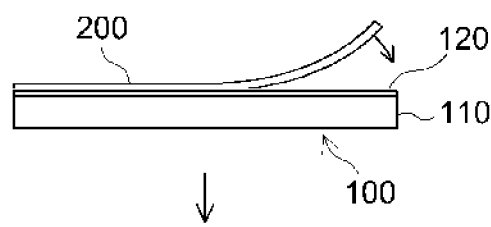
Figure 1:
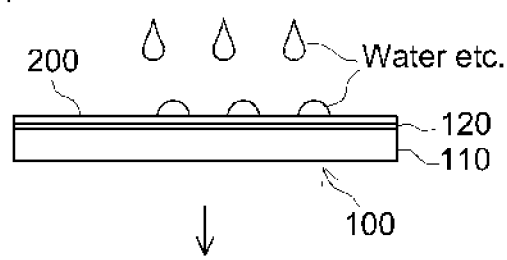
Figure 1:
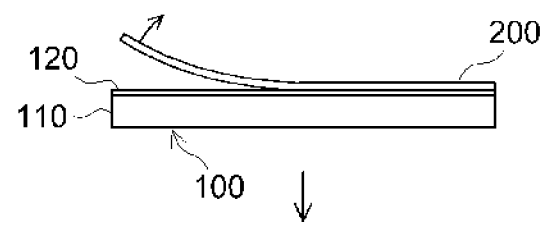
Figure 1:
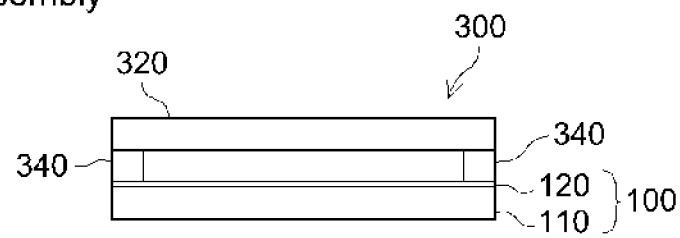

First, in the step (A), a glass plate is obtained. In this embodiment, as shown in FIG. 1(A), a glass plate 100 having a glass substrate 110 and a Low-E layer (in other words, Low-E coating) 120 placed on the glass substrate 110 (which may be referred to as a "Low-E-layer-bearing glass plate" hereinafter) is used. Low-E-layer-bearing glass plate 100 is obtained by forming Low-E layer 120 on one face of glass substrate 110. The Low-E layer comprises a metal layer, an oxide layer such as a metal oxide layer, and a nitride layer such as silicon nitride; usually has a multi-layer structure; and is formed by a known or conventionally-used method such as spattering. The materials forming the respective layers in the Low-E layer include $TiO_2$, $ZrO_2$, $Si_xN_y$, $ZnO_x$, Ag, $NiCrO_x$, and $SnO_2$. As an infrared-reflective layer, a Ag layer is preferably used. In the Low-E layer according to an embodiment, the Ag layer is typically present between $Zn\ O_x$ layers. Depending on the required properties, the Low-E layer may have a multi-layer structure with 5 or more layers, for instance, 10 or more layers, or even 15 or more layers. The thickness of each layer is not particularly limited. It is usually 0 to 1000 Å, or suitably about 10 Å to 700 Å, for instance, about 30 Å to 300 Å. The thickness (overall thickness) of the Low-E layer can be about 10 nm to 1000 nm (e.g. about 50 nm to 500 nm). The size of the glass substrate is not particularly limited with one side (width) being, for instance, about 1 m or greater, or about 2 m or greater. Lately, pieces having surface areas as large as or larger than 2.6 m or even about 3 m or greater at one side are used.

In the step (B), as shown in FIG. 1(B), a protective sheet 200 is applied to the surface of Low-E layer 120 formed on glass substrate 110. Protection sheet 200 is typically applied to the surface in a removable manner. Here, "(to be) applied in a removable manner" means adhesion whose eventual release is intended or expected; in many cases, it refers to adhesion such that the adherend can maintain its surface condition prior to the adhesion basically intact after the protective sheet (PSA sheet) is removed. From the standpoint of the protection, the size of protective sheet 200 is preferably about the same as the surface of Low-E layer 120. Two or more protective sheets may be partially layered to cover the surface to be protected. The material of the outermost face (the surface to which the protective sheet is applied) of the Low-E layer is often an oxide such as $TiO_2$, $ZrO_2$, $ZnO_X$, $NiCrO_X$, and $SnO_2$; or a nitride such as $Si_XN_Y$. The material of the outermost face of the Low-E layer is usually not a metal such as Ag. In the Low-E layer, the metal layer such as the Ag layer is present covered with protective layers such as $ZnO_X$ layers as described earlier. Because the metal layer may corrode due to communication with the outside through a pinhole or the like, it is important to provide covering with the protective sheet disclosed herein.

After the step (B), as the step (C), with respect to the Low-E-layer-bearing glass plate having the protective sheet applied thereon, at least one process may be optionally carried out, selected from the group consisting of transportation, storage, processing, washing and handling. The processing may be the sort of cutting and edge seaming of the Low-E-bearing glass plate having the protective sheet applied thereon. The cutting means and the cut size are suitably selected in accordance with the purpose and are not particularly limited. The protective sheet may be left on the Low-E layer surface even after the Low-E-layer-bearing glass plate is cut. The cut glass plate is optionally washed with water, etc. In the washing step, in addition to the water, a detergent (including surfactant) may be optionally used. During the transportation, storage, processing such as cutting, washing such as a water wash and various kinds of handling, as shown in FIG. 1(C), by the presence of protective sheet 200 thereon, the Low-E layer 120 is protected from damage, wearing, degradation, corrosion, etc.

Subsequently, in the step (D), protective sheet 200 is removed from glass plate 100 (FIG. 1(D)). The PSA sheet used as protective sheet 200 shows suppressed aged adhesive strength; and therefore, after achieving the protection purpose, it can be efficiently removed from glass plate 100 which is the adherend. Glass plate 100 from which protective sheet 200 is removed is usually heated and annealed in an oven. Subsequently, as shown in FIG. 1(E), using the glass plate 100, a glass unit 300 is fabricated. Glass unit 300 is typically a heat-blocking or thermally-insulating glass unit, which can be fabricated by obtaining a pair of glass plates of which at least one is a Low-E-layer-bearing glass plate and assembling a pair-glass (e.g. dual-pane glass) with the surface of Low-E layer 120 of Low-E-layer-bearing glass plate 100 on the inside. Numbers 320 and 340 in FIG. 1(E) represent another glass plate forming the glass unit 300 and a spacer, respectively. Spacer 340 is placed between glass plate 100 and another glass plate 320 to create an open space between glass plates 100 and 320. In the method disclosed herein, in addition to the protective sheet, known or conventionally-used powder or coating liquid may be used together.

<Surface Protection Method>

The surface protection method disclosed herein uses the PSA sheet disclosed herein as a protective sheet (or a surface protective sheet) and typically relates to a method by which surfaces of various articles are partially or entirely protected, with the articles including products, parts (components) and in-process materials used only in production processes. The protection method disclosed herein is characterized by comprising a step of applying the protective sheet to the surface of an article before, during or after processing (an application step).

The surface protection method disclosed herein may further comprise a step of removing the protective sheet from the article (a removal step). Between the application step and the removal step, it may optionally include at least one process selected from the group consisting of transporting, storing, processing, washing and handling the article having the protective sheet applied thereon.

A favorable example of the surface protection method disclosed herein is as described earlier regarding the glass unit production method; the application step and the removal step of this method correspond to the steps (B) and (D) in the production method, respectively. The object in the surface protection method disclosed herein is not limited to the aforementioned Low-E-layer-bearing glass plate and can be applied to various types of articles. In particular, the object (article) can be a glass plate that comprises a glass substrate and a coating layer placed on the glass substrate, with the coating layer including at least one layer selected from the group consisting of a metal layer, a metal oxide layer and a metal nitride layer. The coating layer typically includes a metal layer. The metal forming the metal layer is not limited. Metals such as silver, copper and iron are typically used. Other matters in the surface protection method are not particularly limited. They can be understood by an ordinarily-skilled person in consideration of the description of the glass unit production method. Thus, details are omitted here.

<Constitution of PSA Sheet>

As used herein, the term "PSA" refers to, as described earlier, a material that exists as a soft solid (a viscoelastic material) in a room temperature range and has a property to adhere easily to an adherend with some pressure applied. As defined in C. A. Dahlquist, "*Adhesion: Fundamental and Practice*" (McLaren & Sons (1966), P. 143), the PSA referred to herein is a material that has a property satisfying complex tensile modulus $E^*(1\ Hz) < 10^7\ dyne/cm^2$ (typically, a material that exhibits the described characteristics at 25° C.).

The concept of PSA sheet herein may encompass so-called PSA tape, PSA labels, PSA film, etc. The PSA sheet disclosed herein can be in a roll or in a flat sheet. Alternatively, the PSA sheet may be processed into various shapes.

Figure 2:
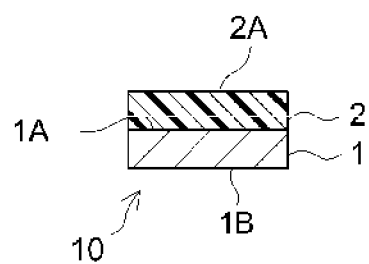
FIG. 2 shows a cross-sectional diagram schematically illustrating an embodiment of the surface protective sheet.

The PSA sheet disclosed herein has a PSA layer on a substrate layer (support substrate). FIG. 2 shows a cross-sectional structure of the PSA sheet according to an embodiment. PSA sheet 10 comprises a PSA layer 2 provided on the first face 1A of a substrate-layer sheet 1. When used, it is applied to an adherend over the face 2A of PSA layer 2. When PSA sheet 10 is used as a surface protective sheet, the face 2A of PSA layer 2 is applied to an object to be protected. The back face 1B (on the reverse side of the first face 1A) of substrate layer 1 is also the back face of PSA sheet 10, forming the outer surface of PSA sheet 10. Prior to use (i.e. before applied to the adherend), PSA sheet 10 can be in a form where the face 2A (adhesive face, i.e. the bonding surface to the adherend) of PSA layer 2 is protected with a release liner (not shown in the drawing) having a release face at least on the PSA layer side. Alternatively, PSA sheet 10 may be in a form where, with the second surface (back face) 1B of substrate layer 1 being a release face, PSA sheet 10 is wound in a roll so that the back face comes in contact with the PSA layer 2 to protect the surface (adhesive face) 2A. PSA sheet can be an on-substrate double-faced PSA sheet having a PSA layer on each face of the substrate layer.

As the release liner, commonly-used release paper and the like can be used without particular limitations. For instance, a release liner having a release layer on a surface of a liner substrate such as plastic film and paper, a release liner formed from a low-adhesive material such as fluorinated polymer (polytetrafluoroethylene, etc.) and polyolefinic resin, and the like can be used. The release layer can be formed by subjecting the liner substrate to surface treatment with various release agents including silicone-based, long-chain alkyl-based, and fluorinated kinds as well as molybdenum sulfide.

The thickness of the PSA sheet disclosed herein is not particularly limited. From the standpoint of the handling properties, the lightness of weight, etc., it is usually suitably about 1000 μm or less (typically about 300 μm or less, e.g. about 150 μm or less). In an embodiment, the thickness of the PSA sheet is preferably about 120 μm or less, more preferably about 100 μm or less, yet more preferably about 75 μm or less, or possibly, for instance, less than 60 μm. The thickness of the PSA sheet can be typically greater than 20 μm, preferably greater than 30 μm, or more preferably greater than 40 μm, for instance, greater than 45 μm.

As used herein, the thickness of the PSA sheet includes the thicknesses of the PSA layer and the substrate layer, but excludes the thickness of the release liner.

The thickness of the substrate layer constituting the PSA sheet disclosed herein is not particularly limited. The thickness of the substrate layer can be, for instance, about 800 μm or less (typically about 250 μm or less). In an embodiment, the thickness of the substrate layer (typically, non-foamed resin film) is preferably about 150 μm or less, more preferably about 100 μm or less, or yet more preferably less than 65 μm, for instance, less than 55 μm. With decreasing thickness of the substrate layer, the PSA sheet tends to exhibit greater conformability to the adherend shape while its lifting and peeling tend to be inhibited. From the standpoint of adherend protection and handling properties, etc., the thickness of the substrate layer can be typically about 10 μm or greater, preferably about 25 μm or greater, more preferably greater than about 30 μm, or yet more preferably greater than 40 μm, or possibly, for instance, greater than 45 μm.

No particular limitations are imposed on the thickness of the PSA layer constituting the PSA sheet disclosed herein. From the standpoint of preventing adhesive transfer to the adherend, the thickness of the PSA layer is usually about 50 μm or less, suitably about 30 μm or less, preferably about 15 μm or less, or more preferably about 8 μm or less (e.g. less than 6 μm). In another embodiment, from the standpoint of the ease of removal, etc., the thickness of the PSA layer is suitably about 5 μm or less, about 4 μm or less, or possibly, for instance, 3 μm or less. From the standpoint of the adhesion, the thickness of the PSA layer is usually suitably about 0.5 μm or greater, preferably about 1 μm or greater, or more preferably greater than 2 μm. The thickness of the PSA layer may be greater than 3 μm, for instance, greater than 4 μm.

<Surface Properties of PSA Layer>

The art disclosed herein is characterized by the surface of the PSA layer having certain properties. The properties of the PSA layer surface can be precisely characterized as mechanical properties based on nanoindentation measurements. In particular, the PSA layer disclosed herein has a surface hardness of 0.3 MPa or greater. With the use of the PSA layer having a surface hardness of 0.3 MPa or greater, the applied PSA sheet shows suppressed aged adhesive strength and excellent efficiency of removal from adherend. Increased hardness of the PSA layer surface limits the adhesive strength to or below a certain level and also limits the increase in adhesive strength with aging; this presumably suppresses the aged adhesive strength as a whole to a level that does not impair the efficiency of removal. In view of the balance between suppression of aged adhesive strength and good adhesion, if the suppression of aged adhesive strength is more important, the surface hardness of the PSA layer is preferably 0.4 MPa or greater, or more preferably 0.8 MPa or greater (e.g. 1.2 MPa or greater, or even 2 MPa or greater). From the standpoint of the adhesion, the maximum surface hardness is usually suitably 5 MPa or less, for instance, 3 MPa or less, or possibly 2.7 MPa or less. In view of the balance, if the prevention of lifting and peeling or the tightness of adhesion to adherend is more important, the surface hardness is preferably less than 2 MPa, more preferably less than 1.2 MPa, yet more preferably less than 0.8 MPa, or particularly preferably less than 0.4 MPa.

The PSA layer disclosed herein is classified into two embodiments in view of the duality of suppression of aged adhesive strength and adhesion to adherend. The PSA layer according to one embodiment (the first embodiment) has a surface hardness of 0.3 MPa or greater and less than 0.7 MPa. In this embodiment, the lower limit of the surface hardness is preferably 0.32 MPa or greater, more preferably 0.34 MPa or greater, or yet more preferably 0.35 MPa or greater; the upper limit is preferably less than 0.55 MPa, more preferably less than 0.45 MPa, yet more preferably less than 0.4 MPa, or particularly preferably less than 0.38 MPa. The PSA layer according to another embodiment (the second embodiment) has a surface hardness of 0.7 MPa or greater and 5 MPa or less. In this embodiment, the lower limit of the surface hardness is preferably 0.8 MPa or greater, or more preferably 0.9 MPa or greater (e.g. 1.2 MPa or greater, or even 2 MPa or greater); the upper limit is preferably 4 MPa or less, more preferably 3 MPa or less, yet more preferably 2.7 MPa or less, or particularly preferably 2.5 MPa or less.

The PSA layer according to a preferable embodiment has a slope of loading curve (the slope of loading curve by nanoindentation, represented by the ratio of the load (μN) to the indentation depth (nm) up to a certain depth) of $0.7 \times 10^{-2}$ μN/nm or greater. The slope (μN/nm) of loading curve provides information equivalent to the elasticity (compressive elasticity) at the PSA layer surface. Suitable elasticity can suppress the aged adhesive strength and preferably bring about excellent efficiency of removal. The slope of loading curve is more preferably $0.73 \times 10^{-2}$ μN/nm or greater, yet more preferably $0.75 \times 10^{-2}$ μN/nm or greater, or particularly preferably $0.78 \times 10^{-2}$ μN/nm or greater. From the standpoint of the adhesion, the slope of loading curve is usually $7 \times 10^{-2}$ μN/nm or less, for instance, $5 \times 10^{-2}$ μN/nm or less, or even $4.5 \times 10^{-2}$ μN/nm or less.

The slope of loading curve of the PSA layer according to the first embodiment is $0.7 \times 10^{-2}$ μN/nm or greater and less than $1.2 \times 10^{-2}$ μN/nm. In this embodiment, the minimum slope of loading curve is preferably $0.75 \times 10^{-2}$ μN/nm or greater, more preferably $0.8 \times 10^{-2}$ μN/nm or greater (e.g. $0.85 \times 10^{-2}$ μN/nm or greater); the maximum slope is preferably less than $1.1 \times 10^{-2}$ μN/nm, more preferably less than $1.0 \times 10^{-2}$ μN/nm, or yet more preferably less than $0.95 \times 10^{-2}$ μN/nm (e.g. less than $0.8 \times 10^{-2}$ μN/nm). The slope of loading curve of the PSA layer according to the second embodiment is $1.2 \times 10^{-2}$ μN/nm or greater and $7 \times 10^{-2}$ μN/nm or less. In this embodiment, the minimum slope of loading curve is preferably $1.4 \times 10^{-2}$ μN/nm or greater (e.g. $1.8 \times 10^{-2}$ μN/nm or greater), or even $2 \times 10^{-2}$ μN/nm or greater (e.g. $3 \times 10^{-2}$ μN/nm or greater). The maximum slope is preferably $5 \times 10^{-2}$ μN/nm or less, or more preferably $4.5 \times 10^{-2}$ μN/nm or less (e.g. $4 \times 10^{-2}$ μN/nm or less). These numerical ranges are suitably selected in view of suppression of aged adhesive strength and good adhesion.

The PSA layer disclosed herein preferably has a minimum load below 0 μN in the unloading curve by nanoindentation. The decreasing load applied to the indenter during unloading means that it is difficult to pull out the indenter pushed into the PSA layer and further suggests that the PSA is cohesive. Such a PSA layer leads to sluggish wetting of the adherend surface and the aged adhesive strength is unlikely to increase. The minimum load of unloading curve is more preferably −0.1 μN or less, for instance, −0.5 μN or less, possibly −1 μN or less, or −2 μN or less. A low minimum load of unloading curve may also indicate that the adsorption (adhesion) to the indenter is being evaluated. In view of the influence of this feature on the light peel, the minimum load of unloading curve is usually suitably −8 μN or greater, preferably −5 μN or greater, or more preferably −3 μN or greater, for instance, −2 μN or greater, or −1 μN or greater.

The minimum load of unloading curve of the PSA layer according to the first embodiment is −8 μN or greater and less than −1 μN. In this embodiment, the lower limit of the minimum load of unloading curve is preferably −5 μN or greater, or more preferably −3 μN or greater; the upper limit is preferably less than −1.5 μN, more preferably less than −1.8 μN, or yet more preferably less than −2 μN. For the PSA layer according to the second embodiment, the minimum load of unloading curve is −1 μN or greater and 0 μN or less. In this embodiment, the lower limit of the minimum load of unloading curve is preferably −0.5 μN or greater, more preferably −0.4 μN or greater (e.g. −0.3 μN or greater), or even −0.2 μN or greater (e.g. −0.15 μN or greater). The upper limit is preferably −0.1 μN or less; it can be, for instance, −0.15 μN or less, or −0.2 μN or less.

Figure 3:
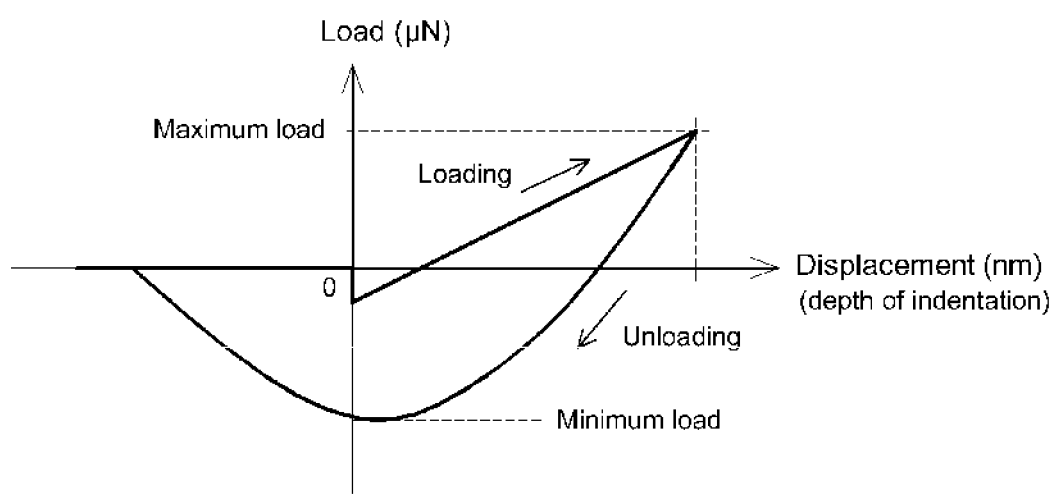
FIG. 3 shows a schematic plot illustrating a loading-unloading curve by nanoindentation.

The PSA layer's surface hardness, the slope of loading curve and the minimum load of unloading curve are determined from the load-unload (push-in/pull-out) curve obtained based on nanoindentation, by indenting a nanoindenter from the PSA layer surface (adhesive face) into the PSA layer up to whichever is less between the depth equivalent to 6% of the thickness of the PSA layer (or the 6% depth; 600 nm for a 10 μm thick PSA layer) and the depth of 300 nm (300 nm depth) (e.g. 300 nm when the PSA layer is 10 μm thick, 120 nm when the PSA layer is 2 μm thick) followed by pulling it out, and plotting the changes in load applied to the indenter (vertical axis) versus displacement of indenter relative to the adhesive face (horizontal axis). FIG. 3 schematically illustrates an example of the load-unload curve by nanoindentation. The surface hardness (MPa) of the PSA layer is determined by dividing the maximum load (Pmax) (μN) of loading curve by the projected area (A) of contact of the indenter when it is indented up to whichever is less between the 6% depth and 300 nm. The slope (μN/nm) of loading curve is determined by dividing Pmax (μN) by the indentation depth (D) (nm). That is, the surface hardness and the slope of loading curve are determined by the following equations:

Surface hardness (MPa)=$P$ max/$A$

Slope of loading curve (μN/nm)=$P$ max(μN)/$D$(nm)

The minimum load (μN) of unloading curve is the smallest value of the unloading curve.

In the nanoindentation, the measurement is carried out at 300 nm depth or a depth equivalent to 6% of the thickness of the PSA layer. By this, for instance, even with respect to a thin PSA layer as those described later in Examples, the behavior of the PSA layer surface can be properly evaluated without influences of the substrate layer supporting the PSA layer, etc. With increasing depth, the influence of the substrate layer may be detected and the device (typically the indenter size) is also a limiting factor. On the other hand, with respect to a thin PSA layer, the stress is small at a depth less than 6% and it tends to be difficult to detect a significant difference. Thus, in the art disclosed herein, whichever is less between the 6% depth and 300 nm is used as the most adequate depth.

The surface hardness, the slope of the loading curve and the minimum load of the unloading curve can be determined by nanoindentation, using, for instance, TRIBOINDENTER available from Hysitron, Inc., under the conditions shown below. The same method is used in the working examples described later.

[Measurement Conditions]
Indenter used: Berkovich (trigonal pyramid) diamond indenter
Measurement method: Single indentation measurement
Measurement temperature: room temperature (25° C.)
Indentation depth setting: 6% of PSA layer's thickness or 300 nm
Rate of indentation: 100 nm/sec
Rate of removal: 100 nm/sec The surface hardness, the slope of loading curve and the minimum load of unloading curve can be adjusted through the base polymer's composition (monomer composition), glass transition temperature (Tg) and molecular weight, the type of crosslinking agent and its amount used, etc. Other features that can be used for adjusting the properties include the gel fraction as well as the polymerization method and conditions for the base polymer.

The surface hardness, the slope of loading curve and the minimum load of unloading curve at 6% depth are referred to as the 6%-depth surface hardness, the 6%-depth slope of loading curve and the 6%-depth minimum load of unloading curve, respectively. The surface hardness, the slope of loading curve and the minimum load of unloading curve at 300 nm depth are referred to as the 300 nm-depth surface hardness, the 300 nm-depth slope of loading curve and the 300 nm-depth minimum load of unloading curve, respectively. In the art disclosed herein, the surface hardness encompasses the 6%-depth surface hardness and the 300 nm-depth surface hardness. The slope of loading curve encompasses the 6%-depth slope of loading curve and the 300 nm-depth slope of loading curve. The minimum load of unloading curve encompasses the 6%-depth minimum load of unloading curve and the 300 nm-depth minimum load of unloading curve.

<PSA Layer>

The type of PSA forming the PSA layer disclosed herein is not particularly limited. The PSA layer may be formed from a PSA composition comprising, as the base polymer (the primary component among the polymers, i.e. a component accounting for 50% by weight or more), one, two or more species selected among various polymers (adhesive polymers), such as acrylic, polyester-based, urethane-based, polyether-based, rubber-based, silicone-based, polyamide-based, and fluorinated polymers. The art disclosed herein can be preferably made, for instance, as a PSA sheet comprising an acrylic PSA layer or a rubber-based PSA layer.

The "acrylic PSA layer" here refers to a PSA layer comprising an acrylic polymer as the base polymer. Similarly, the "rubber-based PSA layer" refers to a PSA layer comprising a rubber-based polymer as the base polymer. The "acrylic polymer" refers to a polymer whose primary monomer (the primary component among the monomers, i.e. a component that accounts for 50% by weight or more of the total amount of the monomers forming the acrylic polymer) is a monomer having at least one (meth)acryloyl group per molecule. Such a monomer may be referred to as an "acrylic monomer" hereinafter. As used herein, the "(meth)acryloyl group" comprehensively refers to acryloyl group and methacryloyl group. Similarly, the "(meth)acrylate" comprehensively refers to acrylate and methacrylate.

(Acrylic Polymer)

A preferable example of the acrylic polymer is a polymer of a starting monomer mixture that comprises an alkyl (meth)acrylate (or a monomer A hereinafter) and may further comprise another monomer (or a monomer B hereinafter) that is copolymerizable with the alkyl (meth)acrylate. The acrylic polymer typically has a monomer unit composition corresponding to the monomer composition of the starting monomer mixture.

A preferable monomer A is an alkyl (meth)acrylate represented by the next general formula (1):

$$CH_2=C(R^1)COOR^2 \qquad (1)$$

Here, $R^1$ in the formula (1) is a hydrogen atom or a methyl group. $R^2$ is an alkyl group having 1 to 20 carbon atoms. Hereinafter, such a range of the number of carbon atoms may be indicated as "$C_{1-20}$." From the standpoint of the polymerization reactivity, polymerization stability, etc., an alkyl (meth)acrylate wherein $R^2$ is a $C_{1-16}$ alkyl group is preferable, and an alkyl (meth)acrylate wherein $R^2$ is a $C_{1-12}$ (typically $C_{1-10}$, e.g. $C_{1-8}$) alkyl group is more preferable.

Examples of an alkyl (meth)acrylate with $R^2$ being a $C_{1-20}$ alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. These alkyl (meth)acrylates can be used solely as one species or in a combination of two or more species.

The art disclosed herein can be preferably implemented in an embodiment where the alkyl acrylate as the monomer A accounts for about 50% by weight or more (more preferably about 75% by weight or more, yet more preferably about 90% by weight or more, e.g. about 95% by weight or more) of the total monomer content. As the alkyl acrylate, an alkyl acrylate with $R^2$ in the formula (1) being a $C_{1-20}$ alkyl group is preferable and an alkyl acrylate with $R^2$ being a $C_{1-12}$ (more preferably $C_{1-10}$, particularly preferably $C_{1-8}$) alkyl group is more preferable. The art disclosed herein can also be preferably implemented in an embodiment where the alkyl acrylate has a $C_{2-8}$ (typically $C_{4-8}$) alkyl group for $R^2$ in the formula (1). For the alkyl acrylate, solely one species or a combination of two or more species can be used. When two or more species of alkyl acrylate are used, to adjust the acrylic polymer's Tg to the most adequate range, etc., an alkyl acrylate A1 with $R^2$ being a $C_{4-20}$ (more preferably $C_{4-10}$, or yet more preferably $C_{4-8}$) alkyl group and an alkyl acrylate A2 with $R^2$ being a $C_{1-3}$ (more preferably $C_{1-2}$, e.g. $C_2$) alkyl group can be used together. In this embodiment, the alkyl acrylate A1 to alkyl acrylate A2 weight ratio (A1:A2) is not particularly limited. It is usually about 5:95 to 95:5, or suitably about 10:90 to 90:10, for instance, about 15:85 to 85:15.

In a preferable embodiment, the monomers include one, two or more species of alkyl methacrylate as the monomer A. With the use of the alkyl methacrylate, the base polymer can be preferably designed so as to achieve desirable surface hardness for the PSA layer. As the alkyl methacrylate, an alkyl methacrylate with $R^2$ in the formula (1) being a $C_{1-10}$ alkyl group is preferable and an alkyl methacrylate with $R^2$ being a $C_{1-4}$ (more preferably $C_1$ or $C_{2-4}$) alkyl group is more preferable. The alkyl methacrylate can be preferably used in combination with an alkyl acrylate. When an alkyl methacrylate and an alkyl acrylate are used together, with one, two or more species of alkyl methacrylate (e.g. $C_{2-4}$ alkyl methacrylate) having a weight $C_{AM}$ and one, two or more species of alkyl acrylate having a weight $C_{AA}$, their ratio ($C_{AM}$:$C_{AA}$) is not particularly limited. In an embodiment, it is usually about 1:9 to 9:1, suitably about 2:8 to 8:2, preferably about 3:7 to 7:3, or more preferably about 4:6 to 6:4. In another embodiment, the ratio of the weight $C_{AM}$ of the alkyl methacrylate (e.g. $C_1$ alkyl methacrylate, i.e. methyl methacrylate (MMA)) in the total amount ($C_{AM}$+$C_{AA}$) of the alkyl (meth)acrylate is usually about 30% by weight or lower, suitably about 20% by weight or lower, preferably about 10% by weight or lower, or more preferably about 7% by weight or lower. On the other hand, the lower limit is usually about 0.1% by weight or higher, suitably about 1% by weight or higher, or preferably about 2% by weight or higher (e.g. about 3% by weight or higher).

The art disclosed herein can be implemented in an embodiment where the monomers are essentially free of an alkyl methacrylate as the monomer A. In an embodiment using an alkyl methacrylate, it can be implemented, for instance, in an embodiment free of a $C_{1-3}$ alkyl methacrylate (typically MMA).

Examples of compounds that can be used as the monomer B may include functional group-containing monomers such as those described below. These functional group-containing monomers may be useful for introducing crosslinking points into the acrylic polymer or for increasing the cohesiveness of the acrylic polymer. Functional group-containing monomers can be used solely as one species or in a combination of two or more species.

Carboxy group-containing monomers: e.g. ethylenic unsaturated mono-carboxylic acids such as acrylic acid (AA), methacrylic acid (MAA), crotonic acid, carboxyethyl (meth)acrylate, and carboxypentyl (meth)acrylate; ethylenic unsaturated dicarboxylic acids such as itaconic acid, maleic acid, fumaric acid, and citraconic acid;

Acid anhydride group-containing monomers: e.g. acid anhydrides of the ethylenic unsaturated dicarboxylic acids such as maleic acid anhydride and itaconic acid anhydride;

Hydroxy group-containing monomers: e.g. hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate; unsaturated alcohols such as vinyl alcohol, allyl alcohol, 2-hydroxyethyl vinyl ether, 4-hydroxybutyl vinyl ether, and diethylene glycol monovinyl ether;

Amide group-containing monomers: for example, (meth)acrylamide, N,N-dimethyl(meth)acrylamide, N-butyl(meth)acrylamide, N-methylol(meth)acrylamide, N-methylolpropane(meth)acrylamide, N-methoxymethyl(meth)acrylamide, N-butoxymethyl(meth)acrylamide;

Imide group-containing monomers: e.g. N-isopropylmaleimide, N-cyclohexylmaleimide, itaconimide;

Amino group-containing monomers: e.g. aminoethyl (meth)acrylate, N,N-dimethylaminoethyl (meth)acrylate, N,N-dimethylaminopropyl (meth)acrylate, t-butylaminoethyl (meth)acrylate;

Epoxy group-containing monomers: e.g. glycidyl (meth) acrylate, methylglycidyl (meth)acrylate, allyl glycidyl ether;

Cyano group-containing monomers: e.g. acrylonitrile, methacrylonitrile; Keto group-containing monomers: e.g. diacetone (meth)acrylamide, diacetone (meth)acrylate, vinyl methyl ketone, vinyl ethyl ketone, allyl acetoacetate, vinyl acetoacetate;

Monomers having nitrogen atom-containing rings: e.g. N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, N-(meth)acryloyl morpholine, N-(meth)acryloylpyrrolidone;

Alkoxysilyl group-containing monomers: e.g. (3-(meth) acryloxypropyl)trimethoxysilane, (3-(meth)acryloxypropyl) triethoxysilane, (3-(meth)acryloxypropyl)methyldimethoxysilane, (3-(meth)acryloxypropyl)methyldiethoxysilane.

Other examples of the compound that can be used as the monomer B include vinyl ester-based monomers such as vinyl acetate and vinyl propionate; aromatic vinyl compounds such as styrene, substituted styrenes (α-methylstyrene, etc.) and vinyltoluene; non-aromatic ring-containing (meth)acrylates such as cyclohexyl (meth)acrylate, t-butylcyclohexyl (meth)acrylate, cyclopentyl (meth)acrylate and isobornyl (meth)acrylate; aromatic ring-containing (meth) acrylates such as aryl (meth)acrylates (e.g. phenyl (meth) acrylate, benzyl (meth)acrylate), aryloxyalkyl (meth)acrylate (e.g. phenoxyethyl (meth)acrylate), arylalkyl (meth) acrylate (e.g. benzyl (meth)acrylate); olefinic monomers such as ethylene, propylene, isoprene, butadiene and isobutylene; chlorine-containing monomers such as vinyl chloride and vinylidene chloride; isocyanate group-containing monomers such as 2-(meth)acryloxyethylisocyanate; alkoxy group-containing monomers such as methoxymethyl (meth) acrylate and ethoxyethyl (meth)acrylate; vinyl ether-based monomers such as methyl vinyl ether, ethyl vinyl ether and isobutyl vinyl ether. These can be used singly as one species or in a combination of two or more species.

Yet other examples of the compound that can be used as the monomer B include polyfunctional monomers. Specific examples of polyfunctional monomers include compounds having two or more (meth)acryloyl groups per molecule such as 1,6-hexanediol di(meth)acrylate, ethylene glycol di(meth)acrylate, pentaerythritol di(meth)acrylate, trimethylolpropane tri(meth)acrylate, dipentaerythritol hexa(meth) acrylate and methylene bisacrylamide. Polyfunctional monomers can be used singly as one species or in a combination of two or more species. When using such a polyfunctional monomer, its amount used is not particularly limited. It is usually suitably about 2% by weight or less (more preferably about 1% by weight or less) of the total monomer content.

The monomer A content in the total monomer content can be, but is not particularly limited to, for instance, about 50% by weight or greater; it is suitably about 60% by weight or greater, preferably about 70% by weight or greater, more preferably about 80% by weight or greater, or yet more preferably about 85% by weight or greater. With the inclusion of the monomer A in a prescribed amount, a PSA sheet with reduced adhesive strength with aging and good adhesiveness can be favorably obtained. The art disclosed herein can be preferably implemented, for instance, in an embodiment where the monomer A content in the total monomer content is about 90% by weight or greater. In an embodiment, the monomer A content can be about 95% by weight or greater, or even about 97% by weight or greater. In an embodiment using a monomer A and a monomer B together, from the standpoint of suitably obtaining the effects of the monomer B, the monomer A content in the total monomer content can be, for instance, 99.9% by weight or less; it is usually preferably 99.5% by weight or less, more preferably 99% by weight or less, or about 97% by weight or less (e.g. 95% by weight or less).

When an aforementioned functional group-containing monomer is copolymerized in the acrylic polymer, the ratio of the functional group-containing monomer to all the monomers forming the acrylic polymer is usually preferably about 0.1% by weight or higher (typically about 0.5% by weight or higher, e.g. about 1% by weight or higher), and preferably about 40% by weight or lower (typically about 30% by weight or lower, e.g. about 20% by weight or lower). For instance, when a carboxy group-containing monomer is copolymerized in the acrylic polymer, from the standpoint of obtaining desirable surface hardness for the PSA layer, the ratio of the carboxy group-containing monomer to the total monomer content is preferably about 1% by weight or higher, or more preferably about 1.5% by weight or higher (e.g. 3% by weight or higher). It is preferably about 20% by weight or lower (preferably about 10% by weight or lower, typically about 7% by weight or lower, e.g. about 3% by weight or lower). When a hydroxy group-containing monomer is copolymerized with the acrylic monomer, from the standpoint of obtaining desirable surface hardness for the PSA layer, the ratio of the hydroxy group-containing monomer to the total monomer content is usually suitably about 0.001% by weight or higher (typically about 0.01% by weight or higher, e.g. about 0.1% by weight or higher), preferably about 1% by weight or higher, or more preferably about 3% by weight or higher; it is preferably about 10% by weight or lower (typically about 7% by weight or lower, e.g. about 5% by weight or lower).

(Rubber-Based Polymer)

In another preferable embodiment, the PSA layer can be a rubber-based PSA layer. Examples of the base polymer include natural rubber; styrene-butadiene rubber (SBR); polyisoprene; butene-based polymer comprising a butene (1-butene or cis- or trans-2-butene) and/or 2-methylpropene (isobutylene) as the primary monomer(s); A-B-A block copolymer rubber and a hydrogenation product thereof, e.g. styrene-butadiene-styrene block copolymer rubber (SBS), styrene-isoprene-styrene block copolymer (SIS), styrene-isobutylene-styrene block copolymer rubber (SIBS), styrene-vinyl-isoprene-styrene block copolymers (SVIS), hydrogenated SBS (styrene-ethylene/butylene-styrene block copolymer (SEBS)), and hydrogenated SIS (styrene-ethylene-propylene-styrene block copolymers (SEPS)). These rubber-based polymers can be used singly as one species or in a combination of two or more species.

(Tg of Base Polymer)

The Tg value of the PSA layer's base polymer (an acrylic polymer in case of an acrylic PSA layer being used) is not particularly limited in Tg. The Tg of the base polymer can be, for instance, about −70° C. or higher. In the PSA sheet according to a preferable embodiment, the base polymer of the PSA layer has a Tg of about −65° C. or higher. According to a base polymer having such a Tg, a PSA layer suited to reducing aged adhesive strength can be favorably formed. In an embodiment where the base polymer has a Tg of about −50° C. or higher (more preferably about −35° C. or higher), greater effects can be obtained. The Tg of the base polymer is usually suitably 0° C. or lower, preferably about −5° C. or lower, more preferably about −15° C. or lower, or yet more preferably about −20° C. or lower (e.g. about −25° C. or lower). In the PSA sheet according to another preferable embodiment, from the standpoint of the adhesion to adherends, the base polymer of the PSA layer has a Tg of about −35° C. or lower, more preferably about −40° C. or lower, or yet more preferably about −45° C. or lower (e.g. about −55° C. or lower). The base polymer's Tg can be adjusted by suitably changing the monomer composition (i.e. the monomer species used in the synthesis of the polymer and their ratio).

In the present description, the Tg of a polymer refers to the value determined by the Fox equation based on the Tg values of homopolymers of the respective monomers forming the polymer and the weight fractions (copolymerization ratio by weight) of the monomers. As shown below, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

For the glass transition temperatures of homopolymers used for determining the Tg, the values found in known documents are used. For instance, with respect to the monomers listed below, for the glass transition temperatures of their homopolymers, the following values are used:

| | |
|---|---|
| 2-ethylhexyl acrylate | −70° C. |
| n-butyl acrylate | −55° C. |
| ethyl acrylate | −20° C. |
| methyl acrylate | 8° C. |
| n-butyl methacrylate | 20° C. |
| methyl methacrylate | 105° C. |
| 2-hydroxyethyl acrylate | −15° C. |
| 4-hydroxybutyl acrylate | −40° C. |
| vinyl acetate | 32° C. |
| styrene | 100° C. |
| acrylic acid | 106° C. |
| methacrylic acid | 228° C. |
| acrylonitrile | 104° C. |

With respect to the Tg values of homopolymers other than the examples listed above, the values given in *Polymer Handbook* (3rd edition, John Wiley & Sons, Inc., Year 1989) are used. With respect to a monomer for which two or more values are listed in the *Polymer Handbook*, the highest value is used. When no values are given in the *Polymer Handbook*, values obtained by the measurement method described in Japanese Patent Application Publication No. 2007-51271 are used.

(Synthesis of Base Polymer)

The method for obtaining the base polymer (e.g. an acrylic polymer) is not particularly limited. Known polymerization methods can be suitably employed, such as solution polymerization, emulsion polymerization, bulk polymerization, and suspension polymerization. Alternatively, it is also possible to employ photopolymerization involving irradiation of light such as UV (typically carried out in the presence of a photopolymerization initiator) and active energy ray irradiation polymerization such as radiation polymerization involving irradiation of radioactive rays such as β rays and γ rays. As the monomer supply method in solution polymerization and emulsion polymerization, a suitable method can be employed among the all-at-once method where all the starting monomer mixture is supplied in one portion, gradual supply method, portion-wise supply method, etc. The polymerization temperature can be suitably selected in accordance with the monomer species, the solvent species, and the polymerization initiator species used, etc. The polymerization temperature is usually suitably about 20° C. or higher, preferably about 40° C. or higher, more preferably about 50° C. or higher; it can also be about 60° C. or higher, about 65° C. or higher, or even about 70° C. or higher. The polymerization temperature is usually suitably about 170° C. or lower (typically about 140° C. or lower), or preferably about 95° C. or lower (e.g. about 85° C. or lower). In emulsion polymerization, the polymerization temperature is preferably about 95° C. or lower (e.g. about 85° C. or lower).

The solvent (polymerization solvent) used in solution polymerization can be suitably selected among heretofore known organic solvents. For instance, it is preferable to use aromatic compounds (typically aromatic hydrocarbons) such as toluene, acetic acid esters such as ethyl acetate, aliphatic or alicyclic hydrocarbons such as hexane and cyclohexane, and the like.

The initiator used in the polymerization can be suitably selected among known or commonly-used polymerization initiators in accordance with the monomer species and the type of polymerization method. For instance, azo-based polymerization initiators can be preferably used, such as 2,2'-azobisisobutyronitrile, 2,2'-azobis(2-methylpropionamidine) disulfate, and 2,2'-azobis(2-amidinopropane) dihydrochloride. Other examples of the polymerization initiator include persulfates such as potassium persulfate and ammonium persulfate; peroxide-based initiators such as benzoyl peroxide, t-butyl hydroperoxide, and hydrogen peroxide; substituted ethane-based initiators such as phenyl-substituted ethane; and aromatic carbonyl compounds. Yet other examples of the polymerization initiator include redox initiators by the combination of a peroxide and a reducing agent. Examples of the redox initiator include a combination of a peroxide (hydrogen peroxide, etc.) and ascorbic acid, a combination of a peroxide (hydrogen peroxide, etc.) and an iron(II) salt, and a combination of a persulfate salt and sodium hydrogen sulfite. These polymerization initiators can be used singly as one species or in a combination of two or more species. The polymerization initiator can be used in a usual amount. For instance, it can be selected from a range of about 0.005 part to 1 part by weight (typically about 0.01 part to 1 part by weight) to 100 parts by weight of the total monomer content.

The surfactant (emulsifier) used in emulsion polymerization is not particularly limited. Commonly-known anionic surfactants, nonionic surfactants and the like can be used. A surfactant having a radically polymerizable functional group can also be used. Hereinafter, the surfactant having a radically polymerizable functional group is referred to as a reactive (polymerizing) surfactant. In contrast to this, a general surfactant free of a radically polymerizable functional group may be referred to as a non-reactive (non-polymerizing) surfactant. For the surfactant, solely one species or a combination of two or more species can be used. The amount of surfactant is usually preferably about 0.1 part by weight or greater (e.g. about 0.5 part by weight or greater) to 100 parts by weight of the total monomer content; and it is preferably about 10 parts by weight or less (e.g. about 5 parts by weight or less) to 100 parts by weight of the total monomer content.

Examples of the non-reactive surfactant include anionic emulsifiers such as sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates; and non-ionic emulsifiers such as polyoxyethylene alkyl ethers, polyoxyethylene alkyl phenyl ethers, polyoxyethylene aliphatic acid esters, and polyoxyethylene-polyoxypropylene block polymers.

The reactive surfactant is not particularly limited as far as it has a radically polymerizable functional group. For instance, the reactive surfactant may have a structure such that a radically polymerizable functional group is incorporated in an aforementioned anionic surfactant or nonionic surfactant. Examples of the radically polymerizable functional group include vinyl group, propenyl group, isopropenyl group, vinyl ether group (vinyloxy group), and allyl ether group (allyloxy group). The concept of propenyl group referred to herein encompasses 1-propenyl group ($CH_3$—CH=CH—) and 2-propenyl group ($CH_2$=CH—$CH_2$—, which may be called allyl group).

Examples of an anionic reactive surfactant include polyoxyethylene (allyloxymethyl) alkyl ether sulfates (e.g. ammonium salts), polyoxyethylene nonyl propenyl phenyl ether sulfates (e.g. ammonium salts), alkyl allyl sulfosuccinates (e.g. sodium salts), methacryloxy polyoxypropylene sulfuric acid ester salts (e.g. sodium salts), and polyoxyalkylene alkenyl ether sulfates (e.g. an ammonium salt having an isopropenyl group as the terminal alkenyl group). When the anionic reactive surfactant is forming a salt, the salt can be, for instance, a metal salt such as sodium salt or a non-metal salt such as ammonium salt and amine salt.

Examples of a nonionic reactive surfactant include polyoxyethylene nonyl propenyl phenyl ether.

Although no particular limitations are imposed, in some embodiments, a reactive surfactant having an oxyethylene chain can be preferably used. The oxyethylene chain refers to a structure of repeating oxyethylene units, that is, a structural moiety represented by —($C_2H_4O$)$_n$—, with n indicating the number of repeats of the oxyethylene unit. For instance, in a preferable reactive surfactant, the number of repeats, n, is about 5 to 30 (e.g. 8 to 25).

From the standpoint of the polymerization stability during the emulsion polymerization, in some embodiments, it is preferable to use a reactive surfactant having a propenyl group. A preferable reactive surfactant has a propenyl group and also an oxyethylene chain.

From the standpoint of the emulsifying ability, etc., in some embodiments, an anionic reactive surfactant (e.g. an anionic reactive surfactant having an oxyethylene chain) can be preferably used. When the anionic reactive surfactant is in a salt form, as the salt, a non-metal salt is preferable. In particular, an ammonium salt is preferable.

When using a nonionic reactive surfactant, more favorable results can be obtained by the combined use with other surfactant(s), such as an anionic reactive surfactant, anionic non-reactive surfactant and nonionic non-reactive surfactant.

By carrying out emulsion polymerization of the starting monomer mixture in the presence of a reactive surfactant having a radically polymerizable functional group, the reactive surfactant may undergo a reaction to be incorporated into the acrylic polymer. The reactive surfactant incorporated in the acrylic polymer is unlikely to bleed out to the PSA layer surface because its move within the PSA layer is limited. Accordingly, the use of the reactive surfactant can reduce bleed-out of a low molecular weight compound to the PSA layer surface. This is preferable from the standpoint of the low-contaminating properties. From the standpoint of obtaining greater low-contaminating properties, it is preferable to apply an embodiment using solely a reactive surfactant as the surfactant for emulsion polymerization.

In the emulsion polymerization, as necessary, various heretofore known chain transfer agents (which can be considered also as a molecular weight-adjusting agent or polymerization degree-adjusting agent) can be used. For the chain transfer agent, solely one species or a combination of two or more species can be used. As the chain transfer agent, mercaptans can be preferably used, such as n-dodecyl mercaptan, t-dodecyl mercaptan, and thioglycolic acid. When using a chain transfer agent, its amount can be, for instance, about 0.01 part to 1 part by weight to 100 parts by weight of the total monomer content. The art disclosed herein can also be preferably practiced in an embodiment that uses no chain transfer agent.

<PSA Composition>

The PSA layer of the PSA sheet disclosed herein can be formed from various forms of PSA compositions. Examples of the forms of PSA compositions include a solvent-based PSA composition containing the PSA (adhesive component(s)) in an organic solvent, a water-dispersed PSA composition containing at least part of the PSA dispersed in an aqueous solvent, an active energy ray-curable PSA composition formulated so as to cure with active energy rays such as UV rays and radioactive rays to form PSA, and a hot-melt PSA composition which is applied in the molten state by heating and forms PSA when it cools to near room temperature.

From the standpoint of reducing environmental stress, a water-dispersed PSA composition can be preferably used. A favorable example of the water-dispersed PSA composition is a water-dispersed PSA composition (a water-dispersed acrylic PSA composition, typically an acrylic emulsion PSA composition) comprising an acrylic polymer as the base polymer. From the standpoint of the adhesive properties, a solvent-based PSA composition is preferable. The hot-melt PSA composition requiring no use of a solvent is advantageous for its excellent handling properties in the production process.

(Crosslinking Agent)

In the art disclosed herein, the PSA composition used to form the PSA layer preferably comprises a crosslinking agent. With the use of crosslinking agent, the gel fraction and the degree of swelling can be suitably adjusted. The type of crosslinking agent used is not particularly limited and can be suitably selected from heretofore known crosslinking agents.

Specific examples of the crosslinking agent include oxazoline-based crosslinking agents, aziridine-based crosslinking agents, isocyanate-based crosslinking agents, epoxy-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents, amine-based crosslinking agents, and silane coupling agents. These can be used solely as one species or in a combination of two or more species. For instance, it is preferable to use one, two or more species selected from a group consisting of oxazoline-based crosslinking agents, aziridine-based crosslinking agents, isocyanate-based crosslinking agents and epoxy-based crosslinking agents. In particular, an isocyanate-based crosslinking agent and an epoxy-based crosslinking agent are preferable.

As the oxazoline-based crosslinking agent, a species having one or more oxazoline groups per molecule can be used without particular limitations. In the water-dispersed PSA composition, it is preferable to use a water-soluble or water-dispersible oxazoline-based crosslinking agent.

The oxazoline group can be either 2-oxazoling group, 3-oxazoline group or 4-oxazoline group. Usually, a 2-oxazoline group-containing oxazoline-based crosslinking agent can be preferably used. As the oxazoline-based crosslinking agent, a water-soluble copolymer or a water-dispersed copolymer can be used, which is obtained by copolymerizing an addition-polymerizable oxazoline such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline with other monomer(s).

Examples of a commercial oxazoline-based crosslinking agent include products of Nippon Shokubai Co., Ltd., under trade names EPOCROS WS-500, EPOCROS WS-700, EPOCROS K-2010E, EPOCROS K-2020E and EPOCROS K-2030E.

Examples of the aziridine-based crosslinking agent include trimethylolpropane tris[3-(1-aziridinyl)propionate] and trimethylolpropane tris[3-(1-(2-methyl)aziridinylpropionate)].

As an example of the isocyanate-based crosslinking agent, a bifunctional or higher polyfunctional isocyanate compound can be used. Examples include aromatic isocyanates such as tolylene diisocyanates, xylylene diisocyanate, polymethylene polyphenyl diisocyanate, tris(p-isocyanatophenyl)thiophosphate, and diphenylmethane diisocyanate; alicyclic isocyanates such as isophorone diisocyanate; and aliphatic isocyanates such as hexamethylene diisocyanate. Commercial products include isocyanate adducts such as trimethylolpropane/tolylene diisocyanate trimer adduct (trade name CORONATE L available from Tosoh Corporation), trimethylolpropane/hexamethylene diisocyanate trimer adduct (trade name CORONATE HL available from Tosoh Corporation) and hexamethylene diisocyanate isocyanurate (trade name CORONATE HX available from Tosoh Corporation). In the water-dispersed PSA composition, it is preferable to use an isocyanate-based crosslinking agent that is soluble or dispersible in water. For instance, a water-soluble, water-dispersible or self-emulsifying isocyanate-based crosslinking agent can be preferably used. A so-called blocked isocyanate-based crosslinking agent can be preferably used as a isocyanate-based crosslinking agent.

As the epoxy-based crosslinking agent, a species having two or more epoxy groups per molecule can be used without particular limitations. An epoxy-based crosslinking agent having 3 to 5 epoxy groups per molecule is preferable. In the water-dispersed PSA composition, it is preferable to use a water-soluble or water-dispersible epoxy-based crosslinking agent.

Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether.

Commercial epoxy-based crosslinking agents include products of Mitsubishi Gas Chemical Co., Inc., under trade names TETRAD-X and TETRAD-C, a product of DIC Corporation under trade name EPICLON CR-5L, a product of Nagase ChemteX Corporation under trade name DENA-COL EX-512, and a product of Nissan Chemical Industries, Ltd., under trade name TEPIC-G.

As the carbodiimide-based crosslinking agent, a low or high molecular weight compound having two or more carbodiimide groups can be used. In a water-dispersed PSA composition, it is preferable to use a water-soluble or water-dispersible carbodiimide-based crosslinking agent. Examples of commercial carbodiimide-based crosslinking agents include the CARBODILITE series such as the CARBODILITE V series (aqueous solutions) including CARBODILITE V-02, CARBODILITE V-02-L2, and CARBODILITE V-04; and the CARBODILITE E series (aqueous dispersions) including CARBODILITE E-01, CARBODILITE E-02, and CARBODILITE E-04 available from Nisshinbo Holdings, Inc.

In an embodiment using an epoxy-based crosslinking agent, its amount used is not particularly limited. From the standpoint of increasing the surface hardness of the PSA layer, the amount of the epoxy-based crosslinking agent is, for instance, to 100 parts by weight of the base polymer (typically an acrylic polymer), suitably about 0.001 part by weight or greater, preferably about 0.01 part by weight or greater, more preferably about 0.1 part by weight or greater, yet more preferably about 1 part by weight or greater, or particularly preferably about 2 parts by weight or greater. From the standpoint of the efficiency of removal of the PSA sheet, the amount of the epoxy-based crosslinking agent can be about 3 parts by weight or greater, for instance, 5 parts by weight or greater (typically greater than 5 parts by weight, or even 6 parts by weight or greater) to 100 parts by weight of the base polymer (typically an acrylic polymer). From the standpoint of the adhesion to adherend, the amount of the epoxy-based crosslinking agent used to 100 parts by weight of the base polymer (typically an acrylic polymer) is suitably about 10 parts by weight or less, or preferably about 8 parts by weight or less; it can be, for instance, 5 parts by weight or less, or even 3 parts by weight or less.

In an embodiment using an isocyanate-based crosslinking agent, its amount used is not particularly limited. From the standpoint of increasing the surface hardness of the PSA layer, the amount of the isocyanate-based crosslinking agent used to 100 parts by weight of the base polymer (typically an acrylic polymer) is, for instance, suitably about 0.5 part by weight or grater, or preferably about 1 part by weight or greater (e.g. 2 parts by weight or greater). The use of the isocyanate-based crosslinking agent facilitates the anchoring to the substrate layer. The amount of the isocyanate-based crosslinking agent used to 100 parts by weight of the base polymer (typically an acrylic polymer) is usually suitably about 10 parts by weight or less, or preferably about 8 parts by weight or less (e.g. less than about 5 parts by weight).

The crosslinking agent content (the total amount of crosslinking agent) in the PSA composition disclosed herein is not particularly limited and can be suitably selected in view of the composition and the molecular weight of the base polymer so as to obtain favorable properties after crosslinked. While no particular limitations are imposed, the amount of the crosslinking agent used to 100 parts by weight of the base polymer (typically an acrylic polymer) is usually about 0.01 part by weight or greater, suitably about 0.1 part by weight or greater, or preferably about 1 part by weight or greater (e.g. about 2 parts by weight or greater). From the standpoint of the adhesion, etc., the amount of the crosslinking agent is usually suitably about 15 parts by weight or less (preferably about 10 parts by weight or less, e.g. about 5 parts by weight or less) to 100 parts by weight of the base polymer.

(Release-Adjusting Agent)

The PSA layer disclosed herein can comprise a release-adjusting agent (peel strength adjuster). The release-adjusting agent in the PSA layer can move to the PSA layer surface with aging to inhibit an increase in peel strength and contribute to increase the efficiency of removal. The use of the release-adjusting agent makes it easier to combine tightness of adhesion to the adherend being protected and light peel during removal of the PSA sheet. The release-adjusting agent disclosed herein is typically a compound having a hydrophobic group and a hydrophilic group, with favorable examples thereof including surfactants such as anionic surfactants and nonionic surfactants. An aliphatic acid amide can also be used as the release-adjusting agent. For the release-adjusting agent, solely one species or a combination of two or more species can be used. The release-adjusting agent can be used in the polymerization or can be added after the polymerization. In a preferable embodiment, the release-adjusting agent can be used in the polymerization (e.g. in emulsion polymerization). In another preferable embodiment, the release-adjusting agent is added after the polymerization, that is, the release-adjusting agent is mixed with the base polymer that has been synthesized in advance.

Non-limiting examples of the surfactant that can be used as the release-adjusting agent include anionic surfactants such as carboxylates, sulfonates, sulfates, and phosphoric acid esters; nonionic surfactants such as ester types, ether types, ester-ether types, and aliphatic acid alkanolamide types having an amide bond between a hydrophobic group and a hydrophilic group; cationic surfactants such as amine salt types, and quaternary ammonium salt types.

In an embodiment of the PSA sheet disclosed herein, a phosphoric acid ester-based surfactant can be preferably used as the release-adjusting agent. Examples of the phosphoric acid ester include alkylphosphoric acid esters such as lauryl phosphoric acid, and lauryl phosphate; polyoxyethylene alkylphosphoric acid esters such as polyoxyethylene tridecyl ether phosphate, polyoxyethylene lauryl ether phosphate, and polyoxyethylene octadecyl ether phosphate; and polyoxyethylene alkyl aryl phosphoric acid esters such as polyoxyethylene nonyl phenyl ether phosphate, polyoxyethylene octyl phenyl ether phosphate, polyoxyethylene dinonyl phenyl ether phosphate, and polyoxyethylene dioctyl phenyl ether phosphate. From the standpoint of preventing their transfer to the adherend, etc., in an embodiment, a phosphoric acid ester having a molecular weight of 150 to 5000 can be preferably used. Among these phosphoric acid esters, the phosphoric acid ester-based surfactant may comprise solely one species or two or more species together. Each phosphoric acid ester in the phosphoric acid ester-based surfactant can be a monoester, a diester, or a mixture of these.

For the phosphoric acid ester-based surfactant, solely one species or a combination of two or more species can be used. The phosphoric acid ester-based surfactant can be used in combination with other surfactant(s). The phosphoric acid ester-based surfactant can be used by itself, in a salt form (e.g. a sodium salt, a potassium salt, a barium salt, a triethanolamine salt, etc.) or as a mixture of these.

The amount of the release-adjusting agent is usually suitably about 0.01 part to 30 parts by weight relative to 100 parts by weight of the base polymer. When the release-adjusting agent content is about 0.01 part by weight or higher, the removability tends to increase. When the release-adjusting agent content is about 30 parts by weight or lower, contamination of the adherend tends to be prevented. The release-adjusting agent content is preferably about 0.1 part by weight or higher (e.g. about 0.3 part by weight or higher, typically about 0.5 part by weight or higher), and suitably about 10 parts by weight or lower, preferably about 5 parts by weight or lower, more preferably about 3 parts by weight or lower, yet more preferably about 2 parts by weight or lower, or particularly preferably about 1 part by weight or lower, to 100 parts by weight of the base polymer.

The PSA composition can comprise, as necessary, a known tackifier such as a rosin-based tackifier, terpene-based tackifier and hydrocarbon-based tackifier. From the standpoint of avoiding an excessive increase in peel strength, the amount of tackifier is preferably about 5 parts by weight or less to 100 parts by weight of the base polymer, or more preferably about 1 part by weight or less. For the PSA sheet disclosed herein, the adhesive strength can be effectively controlled by the base polymer's composition and Tg as well as PSA's gel fraction, etc.; and therefore, the surface protective sheet can be preferably made in an embodiment using no tackifier as well.

The PSA composition may comprise, as necessary, various optional additives generally known in the field of PSA compositions, such as viscosity-adjusting agent (viscosifier, etc.), crosslinking accelerator, plasticizer, softener, filler, anti-static agent, anti-aging agent, UV-absorber, antioxidant and photo-stabilizing agent. The PSA layer disclosed herein may be relatively thin and can be formed in an embodiment essentially free of a viscosifier (e.g. an acrylic viscosifier comprising a carboxylic acid, etc.). As the optional additive, an optional polymer different from the base polymer (e.g. an acrylic polymer) can be used as well. The optional polymer content is usually about 10% by weight or less (e.g. about 1% by weight or less) of the PSA composition. The PSA composition disclosed herein may be essentially free of the optional polymer. With respect to these various optional additives, heretofore known species can be used by typical methods. Because these additives do not characterize the present invention in particular, details are omitted.

(Formation of PSA Layer)

As for the method for providing the PSA layer to a support substrate which forms the substrate layer, it is possible to employ a direct method where the PSA composition as described above is directly provided (typically applied) to the support substrate and subjected to a curing treatment; a transfer method where the PSA composition is applied to a suitable release face (e.g. a releasable surface of a transfer sheet) and subjected to a curing treatment to form a PSA layer on the surface followed by applying and transferring the PSA layer to the support substrate; and so on. The curing treatment may comprise one, two or more processes selected among drying (heating), cooling, crosslinking, supplemental copolymerization reaction, aging, etc. The curing treatment referred to herein also encompasses, for instance, a process (heating process, etc.) simply to allow a PSA composition containing a solvent to dry, a process simply to cool down (solidify) a heat-melted PSA composition. When the curing treatment comprises two or more processes (e.g. drying and crosslinking), these processes may be performed at once or stepwise.

The PSA composition can be applied, for instance, using a commonly used coater such as a gravure roll coater, reverse roll coater, kiss roll coater, dip roll coater, bar coater, knife coater and spray coater. From the standpoint of accelerating the crosslinking reaction, increasing the productivity, etc., the PSA composition is preferably dried with heat. The drying temperature may vary depending on the object (a support substrate, etc.) to which the PSA composition is applied, but it can be, for instance, about 40° C. to 150° C.

(Gel Fraction)

The weight fraction (gel fraction) of the ethyl acetate-insoluble portion of the PSA layer disclosed herein is not particularly limited. It can be, for instance, about 40% or higher (typically about 50% or higher). In an embodiment, from the standpoint of obtaining at least certain surface hardness, the gel fraction of the PSA layer is suitably about 60% or higher, preferably about 80% or higher, or more preferably about 90% or higher. The gel fraction of the PSA layer can be, for instance, about 95% or higher (e.g. about 98% or higher). With increasing gel fraction, the cohesion of the PSA tends to increase while the aged adhesive strength tends to be suppressed. The maximum gel fraction is theoretically 100%. In some embodiments, the gel fraction can be, for instance, about 98% or lower, or even about 95% or lower (e.g. about 90% or lower). The gel fraction can be adjusted by the selection of, for instance, the base polymer composition, the polymerization method and conditions for the base polymer, the molecular weight of the base polymer, the presence of a crosslinking agent as well as its type and amount used if any, and so on. The gel fraction is determined by the method described below. The same method is used for the working examples described later.

(Degree of Swelling)

The degree of swelling of the PSA layer disclosed herein is not particularly limited and can be usually about 30-fold or less. From the standpoint of obtaining at least certain surface hardness, the degree of swelling is suitably about 20-fold or less, preferably about 15-fold or less, or more preferably about 12-fold or less, for instance, about 10-fold or less, or even about 8-fold or less. The minimum degree of swelling is theoretically 1-fold; it can be usually about 3-fold or greater, for instance, about 5-fold or greater. The degree of swelling can be adjusted, for instance, through the molecular weight of the base polymer, the type pf crosslinking agent (distances among functional groups) and its amount used, etc. The degree of swelling is determined by the method described below. The same method is used for the working examples described later.

[Determination of Gel Fraction and Degree of Swelling]

A PSA layer sample (weight: $W_1$) weighing approximately 0.1 g is wrapped into a pouch with a porous polytetrafluoroethylene membrane (weight: $W_2$) having an average pore diameter of 0.2 μm, and the opening is tied with twine (weight: $W_3$). As the porous polytetrafluoroethylene membrane, trade name NITOFLON® NTF 1122 (product of Nitto Denko Corp.; 0.2 μm average pore diameter, 75% porosity, 85 μm thickness) or an equivalent product can be used. The resulting package is immersed in 50 mL of ethyl acetate and stored at room temperature (typically 23° C.) for 7 days. Subsequently, the package is taken out, and any residual ethyl acetate is wiped off the outer surface. The package weight ($W_4$) is measured. The package is then dried at 130° C. for 2 hours and the package weight ($W_5$) is measured. The gel fraction and the degree of swelling of the PSA layer can be determined by substituting the respective values into the following equation:

Gel fraction (%)=[($W_5-W_2-W_3$)/$W_1$]×100

Degree of swelling (fold)=($W_4-W_2-W_3$)/($W_5-W_2-W_3$)

<Substrate Layer>

As the substrate layer of the PSA sheet disclosed herein, resin film, a rubber sheet, a foam sheet, a composite of these, etc., can be used. Examples of the rubber sheet include natural rubber sheets and butyl rubber sheets. Examples of the foam sheet include polyurethane foam sheets, and polychloroprene rubber foam sheets.

The art disclosed herein can be preferably applied to a PSA sheet wherein the substrate layer is resin film. The concept of "resin film" here refers to film typically obtained by molding a thin layer from a resin composition primarily comprising resin components as described below; it should be distinguished from so-called non-woven and woven fabrics. In other words, the concept of resin film excludes non-woven and woven fabrics. A resin film (non-foamed resin film) which is essentially not foamed can be preferably used. Here, the non-foamed resin film refers to resin film that has not been deliberately subjected to a foaming process. In particular, the resin film may have an expansion ratio lower than about 1.1 (e.g. lower than 1.05, typically lower than 1.01).

Examples of the resin components forming the resin film include polyolefinic resins (polyethylene, polypropylene, ethylene-propylene copolymer, ethylene-vinyl acetate copolymer, etc.), poly(vinyl chloride)-based resins (typically soft poly(vinyl chloride)-based resin); poly(vinyl acetate)-based resin, polyurethane-based resins (ether-based polyurethane, ester-based polyurethane, carbonate-based polyurethane, etc.), urethane (meth)acrylate-based resin, thermoplastic elastomers (olefinic elastomer, styrene-based elastomer, acrylic elastomer, etc.), polyester-based resins (polyethylene terephthalate, polybutylene terephthalate, polyethylene naphthalate, polybutylene naphthalate, etc.), polycarbonate-based resin, polyamide-based resin, and polyimide-based resin. Among these resins, solely one species or a combination of two or more species can be used.

While no particular limitations are imposed, in the PSA sheet according to an embodiment, it is preferable to use a substrate layer that comprises, as its primary component(s), one, two or more species of resin selected from the group consisting of polyolefinic resin, poly(vinyl chloride)-based resin, polyurethane-based resin, thermoplastic elastomer and polyester-based resin (typically a substrate layer comprising such resin in an amount exceeding 50% by weight). In another embodiment, in view of the performance, ease of handling, costs, etc., a substrate layer comprising a polyolefinic resin layer, polyester-based resin layer or polyvinyl chloride-based resin layer can be preferably used. Among the resin materials, in view of the heat stability, the lightness of weight, etc., polyolefinic resins, polyurethane-based resins and olefinic elastomers are preferable; in view of the handling properties, etc., polyolefinic resins and olefinic elastomers are particularly preferable.

The PSA sheet disclosed herein can be preferably made in an embodiment comprising a substrate layer that comprises a polyolefinic resin as the primary component, that is, an embodiment wherein the substrate layer is polyolefinic resin film. For instance, it is preferable to use polyolefinic resin film in which 50% by weight or more of the entire substrate layer is polyethylene (PE) resin or polypropylene (PP) resin. In other words, in the polyolefinic resin film, the combined amount of PE resin and PP resin may account for 50% by weight or more of the entire substrate layer.

The PP resin may comprise, as the primary component, various polymer species (propylene-based polymers) that comprise propylene as a monomer unit. The PP resin may be formed essentially of one, two or more species of propylene-based polymer. The concept of propylene-based polymer here includes homopolypropylene as well as a random copolymer of propylene and other monomer(s) (random polypropylene) and a block copolymer (block polypropylene). The concept of propylene-based polymer here includes, for instance, the following species:

Propylene homopolymer (homopolypropylene), for instance, isotactic polypropylene;

Random copolymer (random polypropylene) of propylene and other α-olefin(s) (typically, one, two or more species selected from ethylene and α-olefins having 4 to 10 carbon atoms), preferably random polypropylene comprising propylene as the primary monomer (i.e. the monomer accounting for 50% by weight or more of the total monomer content);

Block copolymer (block polypropylene) of propylene and other α-olefin(s) (typically, one, two or more species selected from ethylene and α-olefins having 4 to 10 carbon atoms), preferably block polypropylene comprising propylene as the primary monomer (i.e. the monomer accounting for 50% by weight or more of the total monomer content).

The PE resin may comprise, as the primary component, various types of polymer (ethylene-based polymer) comprising ethylene as a monomer. The PE resin may be formed essentially of one, two or more species of ethylene-based polymer. The ethylene-based polymer can be an ethylene homopolymer or a copolymer (random copolymer, block copolymer, etc.) of ethylene as the primary monomer and other α-olefin(s) as secondary monomer(s). Favorable examples of the α-olefins include α-olefins having 3 to 10 carbon atoms such as propylene, 1-butene (which can be a branched 1-butene), 1-hexene, 4-methyl-1-pentene and 1-octene. For instance, it is preferable to use PE resin that comprises, as the primary component, an ethylene-based polymer in which an α-olefin as the secondary monomer is copolymerized up to about 10% by weight (typically up to about 5% by weight).

The PE resin may comprise a copolymer of ethylene and a monomer (functional monomer) containing other functional group(s) in addition to a polymerizable functional group, copolymer of an ethylene-based polymer copolymerized with such a functional monomer, or the like. Examples of a copolymer of ethylene and a functional monomer include ethylene-vinyl acetate copolymers (EVA), ethylene-acrylic acid copolymers (EAA), ethylene-methacrylic acid copolymers (EMAA), ethylene-methyl acrylate copolymers (EMA), ethylene-ethyl acrylate copolymers (EEA), ethylene-methyl methacrylate copolymers (EMMA), and copolymers of ethylene and (meth)acrylic acid (i.e. acrylic acid and/or methacrylic acid) crosslinked by metal ions.

The PE resin is not particularly limited in density. The concept of PE resin here includes all of the following: high density polyethylene (HDPE), medium density polyethylene (MDPE), low density polyethylene (LDPE) and linear low density polyethylene (LLPDE). In an embodiment, the density of the PE resin can be, for instance, about 0.90 g/cm$^3$ to 0.94 g/cm$^3$. Preferable PE resins include LDPE and LLDPE. The PE resin may comprise one, two or more species of LDPE and one, two or more species of LLDPE. There are no particular limitations to the respective blend ratios of LDPE and LLDPE, or to the LDPE to LLDPE blend ratio. They can be suitably selected to form a PE resin having desirable properties. As the substrate layer of the PSA sheet disclosed herein, it is preferable to use polyethylenic resin film such as LLDPE film whose LLDPE content is higher than 50% by weight (preferably about 75% by weight or higher, e.g. about 90% by weight or higher) and LDPE film whose LDPE content is higher than 50% by weight (preferably about 75% by weight or higher, e.g. about 90% by weight or higher). Laminate resin film comprising such polyethylenic resin film as a component can be used as well.

The resin film (e.g. polyolefinic resin film) used as the substrate layer of the PSA sheet disclosed herein may comprise, as necessary, suitable components allowable in the substrate layer. Examples of additives that can be suitably added include filler, colorant (pigment such as inorganic pigment, dye), antioxidant, photostabilizer (including radical scavenger and UV absorber), antistatic agent, plasticizer, slip agent, and anti-blocking agent. Each additive can be added, for instance, in an amount similar to a typical amount in the field of resin film used as substrate layers and the like of PSA sheets.

The substrate layer may have a mono-layer structure or a multi-layer structure formed of two, three or more layers. In a multi-layer structure, it is preferable that at least one layer (preferably each layer) is formed of aforementioned resin film. For instance, in a preferable substrate layer, 75% or more (more preferably 90% or more) of the thickness is attributed to mono-layer or multi-layer (typically mono-layer) polyolefinic resin film. The substrate layer may be entirely formed of mono-layer or multi-layer polyolefinic resin film. From the standpoint of the cost-effectiveness, it is preferable to use a substrate layer formed of mono-layer resin film (e.g. LLDPE film, LDPE film, etc.).

The method for producing the substrate layer can be suitably selected among heretofore known methods and is not particularly limited. For instance, when resin film is used as the substrate layer, it is possible to use resin film fabricated by suitably employing a heretofore known general film-forming method such as inflation molding, extrusion, T-die cast molding, and calendar roll molding.

In an embodiment where at least one face (the PSA layer-side face) of the substrate layer is a resin film surface, the resin film surface can be subjected to a heretofore known surface treatment such as corona discharge treatment, plasma treatment, ozone exposure, flame exposure, UV irradiation, acid treatment, alkali treatment, and primer coating. These surface treatments may enhance the tightness of adhesion between the substrate layer and the PSA layer, or the anchoring of the PSA layer onto the substrate layer. In an embodiment using polyolefinic resin film as the substrate layer, it is particularly meaningful to provide these surface treatments.

<Adhesive Properties>

In the PSA sheet disclosed herein, the initial peel strength is suitably about 0.01 N/20 mm or greater, at a tensile speed of 0.3 m/min at 180° peel angle at 30 minutes after applied to a glass plate. The PSA sheet showing such initial peel strength adheres well to an adherend in relatively short time and is less likely to lift off the adherend. When the PSA sheet disclosed herein is used as a surface protective sheet, it may provide good protection. In an embodiment, the initial peel strength can be about 0.05 N/20 mm or greater (e.g. about 0.1 N/20 mm or greater). In another embodiment, the initial peel strength can be about 0.5 N/20 mm or greater (e.g. about 1 N/20 mm or greater). The maximum initial peel strength is not particularly limited. From the standpoint of the light peel, it is usually suitably about 5 N/20 mm or less, or preferably about 2.5 N/20 mm or less (e.g. about 2 N/20 mm or less). In an embodiment, the initial peel strength can be about 1 N/20 mm or less (e.g. 0.4 N/20 mm or less). The initial peel strength is determined by the method described later in Examples.

The PSA sheet disclosed herein preferably has an initial high-rate peel strength $P_1$ of about 10 N/20 mm or less (more preferably about 5 N/20 mm or less, e.g. about 3 N/20 mm or less), determined at a tensile speed of 30 m/min, at 180° peel angle, at 30 minutes after applied to a glass plate. Such a PSA sheet can be removed well from an adherend even in an embodiment of use where it is removed in relatively short time after applied to the adherend. From the standpoint of the ease of application to an adherend, protection of the adherend in an embodiment used as a surface protective sheet, etc., the initial high-rate peel strength $P_1$ is usually suitably about 0.05 N/20 mm or greater, preferably about 0.1 N/20 mm or greater, or more preferably about 0.2 N/20 mm or greater; it can be even 0.5 N/20 mm or greater (e.g. about 1 N/20 mm or greater). The initial high-rate peel strength $P_1$ is measured by the method described later in Examples.

The PSA sheet disclosed herein preferably has an aged high-rate peel strength $P_2$ less than about 11 N/20 mm, determined at a tensile speed of 30 m/min, at 180° peel angle, after applied to a glass plate and stored at 50° C. for seven days. With the PSA sheet satisfying this property, even when it is applied to the adherend for a relatively long time, the aged adhesive strength is sufficiently suppressed and its light peel from adherend can be maintained. Thus, it shows excellent efficiency of removal from adherends. With the PSA sheet having an aged high-rate peel strength $P_2$ of about 5 N/20 mm or less (more preferably about 2 N/20 mm or less), greater efficiency of removal can be obtained. In an embodiment, the aged high-rate peel strength $P_2$ can be about 1 N/20 mm or less, or even about 0.5 N/20 mm or less. From the standpoint of inhibiting lifting and peeling while the adherend is protected (e.g. during processing of the adherend with the PSA sheet applied thereon), the aged high-rate peel strength $P_2$ is usually suitably about 0.05 N/20 mm or greater, preferably about 0.1 N/20 mm or greater, or more preferably about 0.3 N/20 mm or greater. The aged high-rate peel strength $P_2$ is determined by the method described later in Examples.

In the PSA sheet disclosed herein, the increase in aged adhesive strength (i.e. $P_2-P_1$, the difference of aged high-rate peel strength $P_2$ (N/20 mm) and the initial high-rate peel strength $P_1$ (N/20 mm)) is preferably 8.5 N/20 mm or less. A limited increase in aged adhesive strength may suggest, in addition to suppression of the increase in aged adhesive strength, the absolute value of the aged adhesive strength is limited to a level that does not compromise the efficiency of removal when the initial adhesive strength is limited. The PSA sheet satisfying this property is likely to provide excellent efficiency of removal. The increase ($P_2-P_1$) in aged adhesive strength is more preferably 5 N/20 mm or less, yet more preferably 3.5 N/20 mm or less, or particularly preferably 1 N/20 mm or less (typically 0.5 N/20 mm or less, e.g. 0.2 N/20 mm or less). Although the increase ($P_2-P_1$) in aged adhesive strength is usually 0 N/20 mm or greater, the PSA sheet disclosed herein is not limited to a kind that will always have increased aged adhesive strength and $P_2-P_1$ can be, for instance, about −3 N/20 mm or greater, about −1 N/20 mm or greater, or about −0.5 N/20 mm or greater.

While no particular limitations are imposed, the PSA sheet disclosed herein may have a ratio of aged high-rate peel strength $P_2$ (N/20 mm) to initial high-rate peel strength $P_1$ (N/20 mm) (i.e. a $P_2/P_1$ ratio value) of 5 or lower. A small $P_2/P_1$ ratio value indicates a small increase in peel strength with aging. By this, initial adhesion and light peel during removal are favorably combined. From such a standpoint, the $P_2/P_1$ ratio is preferably 4 or lower, more preferably 3 or lower, or yet more preferably 2 or lower, for instance, 1.8 or lower, 1.5 or lower, or even 1.3 or lower. The $P_2/P_1$ ratio is typically 0.8 or higher; it can be, for instance, 1 or higher.

<Applications>

The PSA sheet disclosed herein provides great efficiency of removal from adherend, with the aged adhesive strength limited to or below the prescribed value. Thus, it is preferably used as a surface protective sheet that is applied to surfaces of a metal plate, a coated steel plate, a synthetic resin plate, a glass plate and the like so as to prevent damage (scratches, contamination, etc.) to these surfaces while they are processed, stored or carried; and is removed from the adherend at the end of the protection period. The PSA sheet disclosed herein is favorable as a surface protective sheet for a glass plate used as a building material such as window glass, etc. The glass plate may have a Low-E layer on one face. In producing the glass plate, the Low-E layer surface may be left exposed until two glass plates including the Low-E-layer-bearing glass plate are assembled into a pair-glass (e.g. dual-pane glass) with the Low-E-layer-side surface on the inside. The PSA sheet disclosed herein is preferably used to prevent the Low-E layer surface from suffering the sort of damage, degradation, wearing, and corrosion. In other words, the PSA sheet can be used as a protective sheet for a Low-E layer surface. Low-E-layer-bearing glass plates have higher levels of heat blocking or thermal insulation as compared to conventional glass plates and can improve the efficiency to cool down or heat up indoor spaces; and therefore, they are widely used as building materials such as window glass. The art disclosed herein may indirectly contribute to energy saving and reduction of greenhouse gas emissions.

Because the aged adhesive strength is suppressed, the PSA sheet disclosed herein can provide good efficiency of removal even when, for instance, the period of adhesion to the adherend (which can be the protection period for the adherend) becomes relatively long (typically two weeks or longer, e.g. four weeks or longer). Thus, for instance, it can be favorably used in an embodiment of use where the period from application to adherend (e.g. a glass plate) up to removal from the adherend can be two weeks or more (e.g. four weeks or more). Suppression of aged adhesive strength is meaningful in maintaining good efficiency of removal from an adherend with a large surface area, which tends to be greatly affected by an increase in aged adhesive strength. From such a standpoint, the PSA sheet disclosed herein is preferably used in an embodiment where it covers the entire surface of an adherend having a width of about 1 m or greater, for instance, about 2 m or greater (or even about 3 m or greater). The length of the adherend surface is equal to or greater than the width. In a preferable embodiment, it is preferably used in an embodiment where it entirely covers the surface of one face of a large flat plate (favorably, a flat plate with a smooth surface). In particular, glass plates used for building materials such as window glass are becoming progressively larger in view of efficient production, transportation, etc. It is preferably used in an embodiment where it covers the entire surface of a glass plate (typically the entire Low-E layer surface of the Low-E-layer-bearing glass plate) having a large surface area (e.g. with a surface width above 2.6 m or even at or above about 3 m). The art disclosed herein can bring about good efficiency of removal even with respect to an adherend having such a large surface area.

Matters disclosed by this description include the following:

(1) A method for producing a glass unit, the method comprising:

a step (A) of obtaining a glass plate;

a step (B) of applying a protective sheet to one face of the glass plate;

an optional step (C) of subjecting the glass plate to at least one process selected from the group consisting of transportation, storage, processing, washing and handling;

a step (D) of removing the protective sheet from the glass plate; and a step (E) of assembling a glass unit using the glass plate;

wherein the protective sheet comprises a substrate layer, and a PSA layer provided to at least one face of the substrate layer, and the PSA layer has a surface hardness of 0.3 MPa or greater.

(2) The method according to (1) above, wherein the glass plate comprises a glass substrate and a Low-E layer placed on the glass substrate.

(3) The method according to (2) above, wherein the Low-E layer comprises a metal layer.

(4) The method according to (2) above, wherein the Low-E layer comprises a silver layer.

(5) The method according to any of (1) to (4) above, wherein the glass plate has a width of 1 m or greater.

(6) The method according to any of (1) to (4) above, wherein the glass plate has a width of 2 m or greater.

(7) The method according to any of (1) to (4) above, wherein the glass plate has a width greater than 2.6 m.

(8) The method according to any of (1) to (4) above, wherein the glass plate has a width of 3 m or greater.

(9) The method according to any of (1) to (8) above, wherein the step (B) includes a step of entirely covering one face of the glass plate with at least one of the protective sheet.

(10) The method according to any of (1) to (9) above, wherein the step (C) is essential and in the step (C), the glass plate is washed using water.

(11) A method for protecting an article surface, the method comprising:

a step of applying a protective sheet to a surface of an article before, during or after processing (an application step), wherein the protective sheet comprises a substrate layer and a PSA layer provided to at least one face of the substrate layer, and the PSA layer has a surface hardness of 0.3 MPa or greater.

(12) The method according to (11) above, further comprising a step of removing the protective sheet from the article (a removal step) and optionally including, between the application step and the removal step, at least one process selected from the group consisting of transporting, storing, processing, washing and handling the article having the protective sheet applied thereon.

(13) The method according to (11) or (12) above, wherein the application step includes a step of applying the protective sheet to one face of a glass plate as the article.

(14) The method according to (13) above, wherein the glass plate has a Low-E layer on one face and the application step includes a step of applying the protective sheet to the face of the glass plate on which the Low-E layer is formed.

(15) The method according to (13) or (14) above, wherein the glass plate has a width of 1 m or greater and the application step includes a step of entirely covering one face of the glass plate with at least one of the protective sheet.

(16) The method according to any of (1) to (15) above, wherein the PSA layer has a surface hardness of 5 MPa or less.

(17) The method according to any of (1) to (15) above, wherein the PSA layer has a surface hardness of 0.3 MPa or greater and less than 0.7 MPa.

(18) The method according to any of (1) to (15) above, wherein the PSA layer has a surface hardness of 0.7 MPa or greater and 5 MPa or less.

(19) The method according to any of (1) to (18) above, wherein the protective sheet shows an initial peel strength of 0.01 N/20 mm to 5 N/20 mm to a glass plate.

(20) The method according to any of (1) to (19) above, wherein the PSA layer is formed from a water-dispersed PSA composition, a solvent-based PSA composition, or a hot-melt PSA composition.

(21) The method according to any of (1) to (20) above, wherein the PSA layer is an acrylic PSA layer comprising an acrylic polymer as its base polymer or a rubber-based PSA layer comprising a rubber-based polymer as its base polymer.

(22) The method according to (21) above, wherein the base polymer is chemically or physically crosslinked.

(23) The method according to (22) above, wherein the base polymer is an acrylic polymer crosslinked by a crosslinking agent, wherein the crosslinking agent is at least one species selected from the group consisting of an isocyanate-based crosslinking agent, an epoxy-based crosslinking agent, an oxazoline-based crosslinking agent and an aziridine-based crosslinking agent.

(24) The method according to any of (1) to (23) above, wherein the substrate layer is a resin film.

(25) The method according to any of (1) to (24) above, wherein the substrate layer comprises a polyolefinic resin layer, a polyester-based resin layer or a polyvinyl chloride-based resin layer.

(26) The method according to any of (1) to (25) above, wherein the PSA layer has an ethyl acetate-insoluble portion having a weight fraction of 80% or higher.

(27) The method according to any of (21) to (23) above, wherein the base polymer has a glass transition temperature of −65° C. or higher and −5° C. or lower.

(28) The method according to any of (1) to (27) above, wherein the PSA layer has a thickness of 20 µm or less.

(29) The method according to any of (1) to (28) above, wherein the substrate layer has a thickness of 25 µm to 150 µm.

(30) A PSA sheet comprising a substrate layer and a PSA layer provided to at least one face of the substrate layer, wherein the PSA layer has a surface hardness of 0.3 MPa or greater.

(31) The PSA sheet according to (30) above, wherein the PSA layer has a surface hardness of 5 MPa or less.

(32) The PSA sheet according to (30) or (31) above, wherein the PSA layer has a surface hardness of 0.3 MPa or greater and less than 0.7 MPa.

(33) The PSA sheet according to (30) or (31) above, wherein the PSA layer has a surface hardness of 0.7 MPa or greater and 5 MPa or less.

(34) The PSA sheet according to any of (30) to (33) above, exhibiting an initial peel strength of 0.01 N/20 mm to 5 N/20 mm to a glass plate.

(35) The PSA sheet according to any of (30) to (34) above, wherein the PSA layer is formed from a water-dispersed PSA composition, a solvent-based PSA composition or a hot-melt PSA composition.

(36) The PSA sheet according to any of (30) to (35) above, wherein the PSA layer is an acrylic PSA layer comprising an acrylic polymer as its base polymer or a rubber-based PSA layer comprising a rubber-based polymer as its base polymer.

(37) The PSA sheet according to (36) above, wherein the base polymer is chemically or physically crosslinked.

(38) The PSA sheet according to (37) above, wherein the base polymer is an acrylic polymer crosslinked by a crosslinking agent, wherein the crosslinking agent is at least one species selected from the group consisting of an isocyanate-based crosslinking agent, an epoxy-based crosslinking agent, an oxazoline-based crosslinking agent and an aziridine-based crosslinking agent.
(39) The PSA sheet according to any of (30) to (38) above, wherein the substrate layer is a resin film.
(40) The PSA sheet according to any of (30) to (39) above, wherein the substrate layer comprises a polyolefinic resin layer, a polyester-based resin layer or a polyvinyl chloride-based resin layer.
(41) The PSA sheet according to any of (30) to (40) above, wherein the PSA layer has an ethyl acetate-insoluble portion having a weight fraction of 80% or higher.
(42) The PSA sheet according to any of (36) to (38) above, wherein the base polymer has a glass transition temperature of −65° C. or higher and −5° C. or lower.
(43) The PSA sheet according to any of (30) to (42) above, wherein the PSA layer has a thickness of 20 μm or less.
(44) The PSA sheet according to any of (30) to (43) above, wherein the substrate layer has a thickness of 25 μm to 150 μm.
(45) A surface protective sheet comprising the pressure-sensitive adhesive sheet according to any of (30) to (44) above, wherein the PSA sheet comprises the PSA layer provided to one face of the substrate layer.

EXAMPLES

Several working examples related to the present invention are described below, but the present invention should not be limited to these examples. In the description below, "part(s)" and "%" are by weight unless otherwise specified.

Example 1

Into a reaction vessel equipped with a stirrer, a thermometer, a nitrogen inlet, a condenser and an addition funnel, were placed 45 parts of 2-ethylhexyl acrylate (2EHA), 51 parts of n-butyl methacrylate (BMA) and 4 parts of 2-hydroxyethyl acrylate (HEA) as monomers as well as ethyle acetate as the polymerization solvent. The resulting mixture was allowed to stir under a nitrogen flow for two hours. Oxygen was thus eliminated from the polymerization system. Subsequently, was added 0.2 part of 2,2'-azobisisobutyronitrile and solution polymerization was carried out at 60° C. for 6 hours to obtain an acrylic polymer solution according to this Example.
To the acrylic polymer solution, for 100 parts of the acrylic polymer in the solution, was added 1.5 part of isocyanate-based crosslinking agent (product of Covestro, trade name DESMODUR RFE, tris(p-isocyanatophenyl)thiophosphate, 27% ethyl acetate solution) and mixed with stirring to prepare a PSA composition according to this Example.
Two sheets of 50 μm thick resin film formed of LDPE having one corona-treated face were obtained. The acrylic PSA composition was applied to the corona-treated face of the first sheet of resin film and allowed to dry at 90° C. for 1 minute to form a 5 μm thick PSA layer and obtain a PSA sheet having an overall thickness of 55 μm. The non-corona-treated face (second face) of the second sheet of resin film was applied to the PSA layer and used as release liner.

Example 2

The crosslinking agent was used in the amount shown in Table 1. Otherwise in the same manner as Example 1, a PSA composition according to this Example was prepared and a PSA sheet was fabricated.

Example 3

Were mixed 92 parts of 2EHA, 4 parts of methyl methacrylate (MMA), 4 parts of acrylic acid (AA), 3 parts of emulsifier (based on non-volatiles), and 42 parts of ion-exchanged water. The resulting mixture was stirred with a homomixer to prepare an aqueous emulsion (monomer emulsion). As the emulsifier, was used a reactive anionic emulsifier (trade name AQUALON KH-1025, product of Dai-ichi Kogyo Seiyaku Co., Ltd.).
Into a reaction vessel equipped with a condenser, a nitrogen inlet, a thermometer and a stirrer, was placed 51.5 parts of ion-exchanged water; the resultant was stirred at room temperature for at least one hour while introducing nitrogen gas. Subsequently, the system was heated to 70° C.; 0.05 part of ammonium persulfate was added; and while stirring, the monomer emulsion was gradually added over three hours. After the completion of the addition of the monomer emulsion, the reaction mixture was continuously stirred at 75° C. for two hours and then cooled to 30° C. To the resulting polymerization reaction mixture, 10% ammonia water was added to adjust the pH to 8. An aqueous dispersion of acrylic polymer (50% acrylic polymer) according to this Example was thus obtained.
To the resulting aqueous dispersion, for 100 parts of the acrylic polymer therein, was added 2 parts of a crosslinking agent. The resulting mixture was stirred at 23° C. at 300 rpm for 10 minutes to prepare a PSA composition according to this Example. As the crosslinking agent, was used an epoxy-based crosslinking agent (trade name TETRAD-C, 1,3-bis(N,N-diglycidylaminomethyl)cyclohexane, product of Mitsubishi Gas Chemical, Inc.).
Using the PSA composition prepared above, in the same manner as Example 1, was fabricated a PSA sheet according to this Example.

Examples 4 to 7

The monomer compositions and the crosslinking agent contents were as shown in Table 1. Otherwise basically in the same manner as Example 1, PSA compositions were prepared and PSA sheets were fabricated according to the respective Examples. In Table 1, BA represents n-butyl acrylate.
In Example 7, to 100 parts of the acrylic polymer in the water dispersion, in addition to the crosslinking agent, was added 0.6 part of release-adjusting agent to prepare a PSA composition. As the release-adjusting agent, was used polyoxyethylene alkyl ether phosphate (product of Toho Chemical Industry Co., Ltd., product name PHOSPHANOL RS-410).

[Initial Peel Strength]

The PSA sheet to be measured was cut to a 20 mm wide by 100 mm long strip to prepare a test piece. In a standard environment at 23° C., 50% RH, with a 2 kg rubber roller moved back and forth twice, the test piece was press-bonded to a glass plate as the adherend. The sample was stored in the standard environment for 30 minutes. In the same standard environment, using a universal tensile tester, the initial peel strength (N/20 mm) was determined at a tensile speed of 0.3 m/min, at 180° peel angle. As the glass plate, was used a cut blue plate available from Matsunami Glass Ind., (1.35 mm thick, 100 mm by 100 mm). The initial peel strength can also be determined, using a similar product or other commercial glass plate as the adherend.

[Initial High-Rate Peel Strength $P_1$]

The tensile speed was changed to 30 m/min. Otherwise in the same manner as the initial peel strength measurement above, the initial high-rate peel strength $P_1$ (N/20 mm) was determined.

[Aged High-Rate Peel Strength $P_2$]

The PSA sheet to be measured was cut to a 20 mm wide by 100 mm long strip to prepare a test piece. In a standard environment at 23° C., 50% RH, with a 2 kg rubber roller moved back and forth twice, the test piece was press-bonded to a glass plate as the adherend. The sample was stored in an environment at 50° C. for seven days and then in a standard environment at 23° C., 50% RH for one hour. Subsequently, in the same standard environment, using a universal tensile tester, the aged high-rate peel strength $P_2$ (N/20 mm) was determined at a tensile speed of 30 m/min, at 180° peel angle. The glass plate used as the adherend was the same as the one used in the initial peel strength measurement.

For the PSA sheet according to each Example, Table 1 shows the initial peel strength (N/20 mm), the initial high-rate peel strength $P_1$ (N/20 mm), the aged high-rate peel strength $P_2$ (N/20 mm) and the increase in aged adhesive strength ($P_2-P_1$) (N/20 mm). For each Example, by the methods described above, were determined the surface hardness (MPa), the slope (μN/nm) of loading curve, the minimum load (μN) of unloading curve, the gel fraction (%) and the degree of swelling (fold). The results are shown in Table 1 along with the PSA composition for each Example.

comprises a PSA layer having a surface hardness of 0.3 MPa or greater, the aged adhesive strength is suppressed and excellent efficiency of removal can be obtained.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1: substrate layer
1A: first face
1B: second face
2: PSA layer
2A: adhesive face
10: PSA sheet
100: glass plate (Low-E-layer-bearing glass plate)
110: glass substrate
120: Low-E layer
200: protective sheet
300: glass unit
320: another glass unit
340: spacer

What is claimed is:

1. A method for producing a glass unit, the method comprising:
   a step (A) of obtaining a glass plate;
   a step (B) of applying a protective sheet to a surface of the glass plate;
   a step (C) of subjecting the glass plate with the protective sheet applied to at least one process selected from the group consisting of transportation, storage, processing, washing and handling;
   a step (D) of removing the protective sheet from the glass plate; and
   a step (E) of assembling a glass unit using the glass plate;
   wherein the protective sheet comprises a substrate layer, and a pressure-sensitive adhesive layer on at least one surface of the substrate layer, and
   the pressure-sensitive adhesive layer has a surface hardness of 0.3 MPa or greater.

TABLE 1

| Type of PSA | | Ex. 1 | Ex. 2 | Ex. 3 | Ex. 4 | Ex. 5 | Ex. 6 | Ex. 7 |
|---|---|---|---|---|---|---|---|---|
| | | Solvent-based | | | | Emulsion | | |
| Monomer composition (parts) | 2EHA | 45 | — | 92 | — | 49 | — | — |
| | BA | — | — | — | — | — | — | 58 |
| | BMA | 51 | — | — | — | 49 | — | 40 |
| | MMA | — | — | 4 | — | — | — | — |
| | HEA | 4 | — | — | — | — | — | — |
| | AA | — | — | 4 | — | 2 | — | 2 |
| | Tg | −30° C. | | −62° C. | | −31° C. | | −28° C. |
| Release-adjusting agent (parts) | | — | — | — | — | — | — | 0.6 |
| Crosslinking agent (parts) | Epoxy | — | — | 2 | 6 | 1 | 3 | 1 |
| | Isocyanate | 1.5 | 3 | — | — | — | — | — |
| Gel fraction (%) | | — | — | 97.5 | 98.7 | 88.1 | 86.6 | 97.4 |
| Deg. of swelling (fold) | | — | — | 7.5 | 6.5 | 11.2 | 10.9 | 8.3 |
| Surface hardness (MPa) | | 0.345 | 0.367 | 0.398 | 0.945 | 0.392 | 0.493 | 0.286 |
| Slope of loading curve (μN/nm) | | 0.0082 | 0.0090 | 0.0078 | 0.0155 | 0.0084 | 0.0106 | 0.0067 |
| Minimum load of unloading curve (μN) | | −2.73 | −2.12 | −1.60 | −0.295 | −2.33 | −1.64 | −4.33 |
| Peel strength | | | | | | | | |
| Initial (N/20 mm) | | 1.85 | 0.84 | 0.34 | 0.12 | 2.16 | 1.26 | 1.87 |
| Initial high-rate, $P_1$ (N/20 mm) | | 0.35 | 0.24 | 4.40 | 0.86 | 1.13 | 0.60 | 2.58 |
| Aged high-rate, $P_2$ (N/20 mm) | | 0.37 | 0.41 | 3.77 | 3.88 | 0.75 | 0.74 | 11.40 |
| P2 − P1 (N/20 mm) | | 0.02 | 0.17 | −0.63 | 3.02 | −0.38 | 0.14 | 8.82 |

As shown in Table 1, in each of the PSA sheets according to Examples 1 to 6 whose PSA layers had surface hardness at or above 0.3 MPa, the aged adhesive strength (aged high-rate peel strength) was suppressed at low levels. In these Examples, the increase in aged adhesive strength was also significantly limited. On the other hand, in Example 7 with surface hardness below 0.3 MPa, the aged high-rate peel strength was at least 11 N/20 mm and the increase in aged adhesive strength was as high as about 8.8 N/20 mm. These results indicate that according to a PSA sheet that 2. The method according to claim 1, wherein the glass plate comprises a glass substrate and a low-emissivity layer placed on the glass substrate.

3. The method according to claim 1, wherein the glass plate has a width of 3 m or greater.

4. The method according to claim 1, wherein the step (B) includes covering an entire surface of the glass plate with at least one of the protective sheet.

5. The method according to claim 1, wherein the pressure-sensitive adhesive layer is an acrylic pressure-sensitive adhesive layer comprising an acrylic polymer as a base polymer or a rubber-based pressure-sensitive adhesive layer comprising a rubber-based polymer as a base polymer.

6. The method according to claim 1, wherein the protective sheet exhibits an initial peel strength of 0.1 N/20 mm or greater to a glass plate.

7. The method according to claim 1, wherein the pressure-sensitive adhesive layer comprises an acrylic polymer as a base polymer, the acrylic polymer being crosslinked by a crosslinking agent and the crosslinking agent being at least one species selected from the group consisting of an isocyanate-based crosslinking agent, an epoxy-based crosslinking agent, an oxazoline-based crosslinking agent and an aziridine-based crosslinking agent.

8. A pressure-sensitive adhesive sheet comprising a substrate layer and a pressure-sensitive adhesive layer on at least one surface of the substrate layer, wherein the pressure-sensitive adhesive layer has a surface hardness of 0.3 MPa or greater, and
the pressure-sensitive adhesive sheet exhibits an initial peel strength of 0.1 N/20 mm or greater to a glass plate.

9. The pressure-sensitive adhesive sheet according to claim 8, wherein the pressure-sensitive adhesive layer has a surface hardness of 5 MPa or less.

10. The pressure-sensitive adhesive sheet according to claim 8, wherein the pressure-sensitive adhesive layer has a surface hardness of 0.3 MPa or greater and less than 0.7 MPa.

11. The pressure-sensitive adhesive sheet according to claim 8, wherein the pressure-sensitive adhesive layer has a surface hardness of 0.7 MPa or greater and 5 MPa or less.

12. The pressure-sensitive adhesive sheet according to claim 8, exhibiting an initial peel strength of 0.1 N/20 mm to 5 N/20 mm to a glass plate.

13. The pressure-sensitive adhesive sheet according to claim 8, wherein the pressure-sensitive adhesive layer is formed from a water-dispersed pressure-sensitive adhesive composition, a solvent-based pressure-sensitive adhesive composition or a hot-melt pressure-sensitive adhesive composition.

14. The pressure-sensitive adhesive sheet according to claim 8, wherein the pressure-sensitive adhesive layer comprises an acrylic polymer as a base polymer or a rubber-based polymer as a base polymer.

15. The pressure-sensitive adhesive sheet according to claim 14, wherein the base polymer is chemically or physically crosslinked.

16. The pressure-sensitive adhesive sheet according to claim 15, wherein the base polymer is an acrylic polymer crosslinked by a crosslinking agent and the crosslinking agent is at least one of an isocyanate-based crosslinking agent, an epoxy-based crosslinking agent, an oxazoline-based crosslinking agent or an aziridine-based crosslinking agent.

17. The pressure-sensitive adhesive sheet according to claim 8, wherein the pressure-sensitive adhesive layer has a thickness of 20 μm or less.

18. The pressure-sensitive adhesive sheet according to claim 8, wherein the pressure-sensitive adhesive layer is an acrylic pressure-sensitive adhesive layer comprising an acrylic polymer as a base polymer, the acrylic polymer comprises an alkyl methacrylate as a monomer unit.

19. The pressure-sensitive adhesive sheet according to claim 8, wherein the pressure-sensitive adhesive layer is an acrylic pressure-sensitive adhesive layer comprising an acrylic polymer as a base polymer, the acrylic polymer comprising an alkyl (meth)acrylate and a carboxy group-containing monomer as a monomer unit.

20. The pressure-sensitive adhesive sheet according to claim 8, wherein the pressure-sensitive adhesive layer comprises a base polymer, the base polymer having a glass transition temperature of −70° C. or higher and 0° C. or lower.

* * * * *